US008682453B2

(12) United States Patent
Gahinet et al.

(10) Patent No.: US 8,682,453 B2
(45) Date of Patent: Mar. 25, 2014

(54) INTERACTIVE SYSTEM FOR CONTROLLING MULTIPLE INPUT MULTIPLE OUTPUT CONTROL (MIMO) STRUCTURES

(75) Inventors: Pascal Gahinet, Hopkinton, MA (US); Pierre Apkarian, Toulouse (FR); Dominikus Noll, Lauzerville (FR)

(73) Assignee: The Mathworks, Inc., Natick, MA (US)

( * ) Notice: Subject to any disclaimer, the term of this patent is extended or adjusted under 35 U.S.C. 154(b) by 537 days.

(21) Appl. No.: 12/893,670

(22) Filed: Sep. 29, 2010

(65) Prior Publication Data
US 2012/0035748 A1  Feb. 9, 2012

Related U.S. Application Data

(60) Provisional application No. 61/351,650, filed on Jun. 4, 2010, provisional application No. 61/351,658, filed on Jun. 4, 2010.

(51) Int. Cl.
*G05B 13/02* (2006.01)

(52) U.S. Cl.
USPC .............................................. 700/31; 703/13

(58) Field of Classification Search
USPC .............................. 700/30, 31; 703/13, 14, 15
See application file for complete search history.

(56) References Cited

PUBLICATIONS

Erm et al., "Time to go H ∞ ?", vol. 5496, SPIE 2004.*
Matiakis et al., "Local and remote control measures for Networked Control Systems", Inst. of Autom. Control Eng., Tech. Univ., Munich, Germany, IEEE 2008.*
Gahinet, P. et al., "Loop Shaping," LMI Control Toolbox, User's Guild, Chapter 6, pp. 6-1-6-24, MathWorks (1995).
Mammadov, Musa A. et al., "A Nonsmooth Optimization Approach to H¥ Synthesis," Proceedings of the 44th IEEE Conference on Decision and Control, pp. 6893-6898 (2005).
Invitation to Pay Additional Fees for Application No. PCT/US2011/053974, dated Jan. 2, 2012.
Iruthayarajan, M. Willjuice et al., "Evolutionary algorithms based design of multivariable PID controller," Expert Systems with Applications. vol. 36:9159-9167 (2009).
Lewis, A.L., "Nonsmooth optimization and robust control," Annual Reviews in Control, vol. 31:167-177 (2007).
Li, Bao et al., "Variational Surface Approximation and Model Selection," Computer Graphics Forum, Proc. of Pacific Graphics, vol. 28(7):1-10 (2009).
Rogers, Jim, "Proxy Objects," retrieved online at: http://newsletters.hagerman.com/newsletters/ebul63-CT.htm, e-vol. 63, pp. 1-3 (2008).
Wolodkin, Greg et al., "Autopilot Design using Simulink and the Control System Toolbox," MathWorks, retrieved online at: http://www.mathworks.nl/company/newsletters/digest/sept98/aircraft.html, pp. 1-8 (1998).

(Continued)

*Primary Examiner* — Carlos Ortiz Rodriguez
(74) *Attorney, Agent, or Firm* — Harrity & Harrity, LLP

(57) ABSTRACT

A method and system allow users to interactively formulate and solve multivariable feedback control problems. Users can solve problems where a plurality of control elements are distributed over one or more feedback loops and need to be jointly tuned to optimize overall performance and robustness of a control system. The method and system allow users to specify design requirements and objectives in formats familiar to the user. The method and system can operate on tunable parameters to solve the control problem in a manner that satisfies the design requirements and/or objectives provided by the user.

20 Claims, 28 Drawing Sheets

(56) References Cited

PUBLICATIONS

Zhang, Yan et al., "FPGA vs. GPU for Sparse Matrix Vector Multiply," FPT 2009, Internationanl Conference on Field-Programmable Technology, pp. 255-262 (2009).

International Search Report and Written Opinion for Application No. PCT/US2011/053974, pp. 1-23, dated Apr. 3, 2012.

Apkarian, Pierre et al., "Nonsmooth Hinfinity Synthesis," IEEE Transactions on Automatic Control, vol. 51(1):71-86 (2006).

Doyle, John C. et al., "State-Space Solutions to Standard H2 and Hinfinity Control Problems," IEEE Transactions on Automatic Control, vol. 34(8):831-847 (1989).

* cited by examiner

```
>> G = ltiblock.gain('G',1,2)

G = ltiblock.gain
  Package: ltiblock

Properties:
              Gain: [1x1 param.Continuous]
                Ts: 0
          TimeUnit: ''
         InputName: {2x1 cell}
         InputUnit: {2x1 cell}
        InputGroup: [1x1 struct]
        OutputName: {''}
        OutputUnit: {''}
       OutputGroup: [1x1 struct]
              Name: 'G'
             Notes: {}
          UserData: []
```

FIG. 11

```
>> G.Gain          ~1205 ans =

Name: 'Gain'
        Value: [0 0]
      Minimum: [-Inf -Inf]
      Maximum: [Inf Inf]
         Free: [1 1]
        Scale: [1 1]
         Info: [1x2 struct]
```
⎫ 1210

```
>> G.Gain.Value(1) = 1      ~1215
>> G.Gain.Free(1) = false   ~1220
>> G.Gain Name: 'Gain'
        Value: [1 0]
      Minimum: [-Inf -Inf]
      Maximum: [Inf Inf]
         Free: [0 1]
        Scale: [1 1]
         Info: [1x2 struct]
```
⎫ 1225

FIG. 12

```
>> C = ltiblock.pid('C','pi')      % PI controller
>> F = ltiblock.tf('F',2,3)        % Transfer function with 2 zeros and 3 poles
>> MC = ltiblock.ss('MC',3,2,2)    % State-space model with 3 states,
                                   % 2 inputs, and 2 outputs >> s = tf('s');                    % Laplace variable
>> a = realp('a',2);               % Create the parameter "a"
>> F = feedback(a/s,1)             % Construct (a/s)/(1+(a/s))

>> F.Blocks ans =
    a: [1x1 realp]

>> a = realp('a',2);               % Create the parameter "a"
>> F = tf(a,[1 a])                 % Create the transfer function a/(s+a)

>> a = 2;
>> F = tf(a,[1 a])

Transfer function:
    2
  -----
  s + 2
```

- 1305: `>> C = ltiblock.pid(...)`
- 1310: `>> F = ltiblock.tf(...)`
- 1315: `>> MC = ltiblock.ss(...)`
- 1320: Lines creating parameter "a" and constructing feedback
- 1325: `>> F.Blocks`
- 1330: ans block
- 1335: Lines creating parameter "a" and transfer function a/(s+a)
- 1340: `>> a = 2; >> F = tf(a,[1 a])`
- 1345: Transfer function output

FIG. 13

```
>> K = realp('K',zeros(1,3));    % Create parameter matrix K
>> L = realp('L',zeros(3,2));    % Create parameter matrix L
>> OBC = ss(A-B*K-L*C+L*D*K,L,-K,0)
```
⎫
⎬ ~1410
⎭

```
>> OBC.Blocks
```
~1420

```
ans =

K: [1x3 realp]
  L: [3x2 realp]
```
⎫
⎬ ~1430
⎭

FIG. 14

```
% Specify tunable blocks
>> DM = ltiblock.gain('Decoupler',eye(2));
>> PI_L = ltiblock.pid('PI_L','pi');
>> PI_V = ltiblock.pid('PI_V','pi');

% Derive closed-loop transfer T
>> C = append(PI_L,PI_V) * DM;
>> T = feedback(G * C , eye(2));

>> [H,B] = getLFTModel(T)

Continuous-time model.

B =

[1x1 ltiblock.pid ]
    [1x1 ltiblock.pid ]
    [2x2 ltiblock.gain]
```

1620 (continued from Fig. 16A)

FIG. 16B

```
s = tf('s');
pKa = realp('Ka',0);
pKq = realp('Kq',0);
pKf = realp('Kf',0);
pKi = realp('Ki',1);
pTa1 = realp('Ta1',1);
pW1 = realp('w1',0);
pW2 = realp('w2',0);

Integrator   = pKi/s;                              % Ki/s
AlphaSensor  = tf(1,[pTa1 1]);                     % 1/(Ta1*s+1)
PitchFilter  = tf([1 pW1],[1 pW2]);                % (s+w1)/(s+w2)

wc = 1;         % target crossover
LS = (1+0.01*s/wc)/(0.01+s/wc);
bodemag(LS,{1e-3,1e3}), grid, title('Target loop shape');
```

```
% Tuned blocks
TunedBlocks = {...
    'f14/Controller/Alpha-sensor Low-pass Filter',...
    'f14/Controller/Pitch Rate Lead Filter',...
    'f14/Controller/Ka',...
    'f14/Controller/Kq',...
    'f14/Controller/Kf',...
    'f14/Controller/Integrator'};
% Structured compensator of Fig. 4
C = blkdiag(AlphaSensor,PitchFilter,pKa,pKq,pKf,Integrator);

linios = [...
    linio('f14/Controller/Stick Prefilter',1,'in') ;  ... % r
    linio('f14/Aircraft Dynamics Model',4,'outin') ;  ... % alpha,n
    linio('f14/Controller',1,'in') ]; % d
H = linlft('f14',linios,TunedBlocks);
% Closed-loop transfer [r;n;d] -> y=alpha
Ta0 = lft(H,C);

```
beta = 3;
Win = blkdiag(1,1/LS,beta);
Wout = blkdiag(1,LS);
T10 = Wout * T10 * Win;
T10.InputName = {'r','n','d'};
T10.OutputName = {'y','e'};

linios = [...
    linio('f14/Aircraft Dynamics Model',4,'inout') ; ... % alpha
    linio('f14/Aircraft Dynamics Model',3,'inout') ];    % q
H = linlft('f14',linios,TunedBlocks);
S0 = lft(H,C);
T20 = S0;
```

FIG. 22

INTERACTIVE SYSTEM FOR CONTROLLING MULTIPLE INPUT MULTIPLE OUTPUT CONTROL (MIMO) STRUCTURES

RELATED APPLICATIONS

The instant application claims priority to U.S. Provisional Patent Application No. 61/351,650 and 61/351,658 both filed Jun. 4, 2010, the contents of which are incorporated by reference herein.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIGS. 11-14 illustrate exemplary interfaces for displaying commands, objects, and outputs that can be used with embodiments of the invention;

FIGS. 16A and 16B illustrate an exemplary interface for displaying commands and/or outputs that can be used with an embodiment of the invention;

FIG. 19 illustrates an exemplary interface that can be used to receive inputs and/or display outputs related to the autopilot system of FIGS. 17 and 18;

FIGS. 21 and 22 illustrate exemplary interfaces for receiving inputs and/or displaying outputs related to the autopilot system of FIGS. 17 and 18;

DETAILED DESCRIPTION

Conventional approaches for designing multiple input multiple output (MIMO) controller can include a technique referred to as H∞ synthesis.

Conventional H∞ Synthesis Technique

Figure 1:
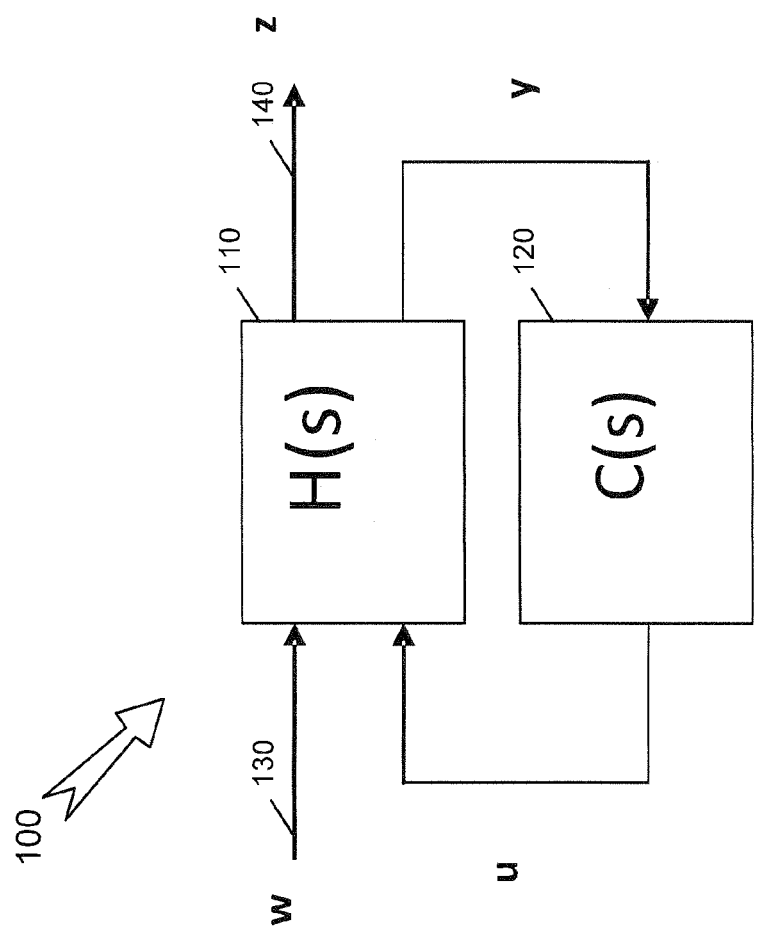
FIG. 1 illustrates a conventional configuration for employing H∞ synthesis techniques.

FIG. 1 illustrates a configuration representing application of a standard H∞ synthesis technique. FIG. 1 can include plant H(s) 110 and controller C(s) 120. In FIG. 1, standard H∞ synthesis computes a controller C(s) 120 that minimizes the closed-loop peak gain from input w 130 to output z 140. The controller C(s) 120 may represent a lumped H∞ controller which may operate as a black box (e.g., a user may not have ready access to internal representations within the black box). H(s) 110 may represent a plant which can be controlled using controller C(s) 120. Plant H(s) 110 can be a linear plant model.

Conventional H∞ synthesis may be used to minimize the peak input/output gain of the closed-loop response (the so-called H∞ norm) for system 100. A user may have a design specification for a control problem that specifies aspects, or goals, of a design, such as bandwidth, roll-off, overshoot, and/or stability margins for the controlled plant H(s). An H∞ synthesis based framework may be applicable to helping users achieve specifications; however, few users (such as engineers) are comfortable or proficient at using conventional H∞ techniques. For example, users may find it tedious, non-intuitive, and/or time-consuming to convert ordinary specifications with which the user is familiar into a normalized closed-loop gain constraint required by conventional H∞ synthesis techniques. In addition, the technical restrictions of the conventional H∞ synthesis tools and techniques may further hinder and/or confuse typical users.

Conventional H∞ synthesis techniques may further be undesirable to users because they do not support typical design workflows of the users. In addition, conventional H∞ synthesis techniques treat controller C(s) 120 as a black box that does not allow the user easy access to internal representations of the system structure that controller C(s) 120 represents. Further, conventional H∞ synthesis techniques couple separate input connections and insert a control block between those connections when generating C(s) 120 for a given system. This approach results in a structure for C(s) 120 that does not represent a system structure from which C(s) 120 was derived, which further exacerbates difficulties that typical users can face when working with conventional H∞ synthesis techniques.

For example, users may desire design tools that provide substantially real-time operation (i.e., the tools allow the user to interactively design, modify, and run aspects of a design with out encountering processing delays that unduly annoy the user or that adversely interfere with the user's interactions with the design tool). Conventional H∞ synthesis techniques may not support interactive operation for a number of reasons. For example, conventional techniques may attempt to compute an optimal controller by repeatedly solving a pair of Riccati equations when no particular structure or order constraint is imposed on the controller C(s) 120. These repeated attempts to solve the pair of equations can be time consuming and computationally expensive, which tends to make conventional H∞ synthesis techniques undesirable particularly for interactive design applications.

OVERVIEW OF EXEMPLARY TECHNIQUES AND EMBODIMENTS

Exemplary embodiments provide a novel technique that allows users to use intuitive user interfaces to formulate and solve multivariable feedback control problems. For example, exemplary embodiments allow users to work with control problems having a plurality of control elements distributed over one or more feedback loops that need to be jointly tuned to optimize the overall performance and robustness of a control system. Exemplary embodiments are scalable and can be applied to control problems having substantially any number of feedback loops and/or of any degree of complexity.

Exemplary embodiments can make use of a system representation that is similar to FIG. 1 but that allows a user to treat controller C(s) as a white box instead of a black box. For example, exemplary embodiments allow controller C(s) to have a block diagonal structure where each block itself has some fixed structure and complexity. The additional complexity of C(s) allows users to represent controller C(s) in a way that is consistent with a control architecture of a system being analyzed. Exemplary embodiments can use non-smooth H∞ optimizers to automatically tune arbitrary MIMO control structures. Exemplary techniques specialize the solvers to the canonical structure of an H∞ synthesis representation where C(s) includes a block diagonal structure.

Exemplary embodiments and techniques remove obstacles presented by conventional techniques when attempting to perform MIMO tuning tasks. For example, exemplary embodiments and techniques automate the translation of the control architecture and controller structure into a cost function and parameter vector suitable for the optimizer. Exemplary embodiments and techniques further allow gradients to be computed inexpensively (o(N) per iteration where N is the number of parameters), and further allow gradients to be computed in an object-oriented fashion where each tunable block type (gain PID, transfer function, state-space, raw parameter, etc.) provides its own contribution to the gradient. Exemplary embodiments make use of gradients without requiring that a user compute block-wise gradients and combine them together to get the overall gradient of the cost function as done in conventional approaches. The conventional approaches can further be manually intractable except for simple architectures and can be orders of magnitude less efficient that techniques employed in aspects of the invention.

The exemplary techniques of the invention, when embodied in computational hardware allow users to perform MIMO tuning tasks interactively. For example, exemplary embodiments allow users to experience typical tuning times ranging from less than a second to under 30 seconds using a standard personal computer (PC) and a technical computing environment, such as the MATLAB technical computing and programming environment. Embodiments can be deployed in multi-core or other types of multi-processing devices or environments to reduce processing times.

Embodiments described herein will be discussed in connection with linear control systems for ease of presentation; however, embodiments of the invention can be used to solve nonlinear control problems. For example, exemplary techniques can support approaches to nonlinear control design, including but not limited to, gain scheduling.

Exemplary System

Figure 2:
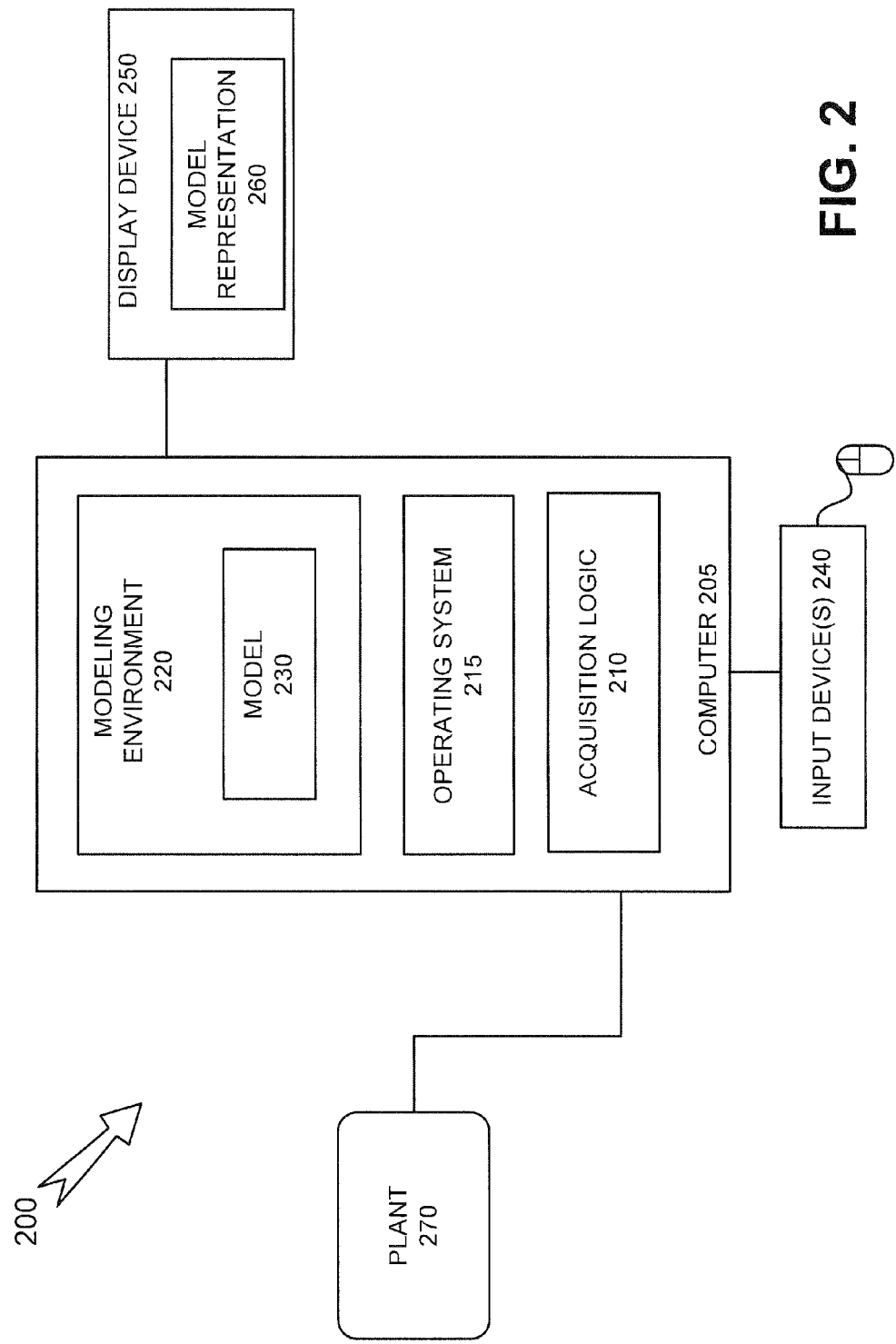
FIG. 2 illustrates an exemplary system for implementing embodiments and techniques of the invention.

FIG. 2 illustrates an exemplary system 200 for practicing an embodiment. System 200 may be used to construct a model that includes one or more entities, to design and implement a PID controller for the model, and/or to generate code from the model, e.g., to generate code for the controller. System 200 may include computer 205, acquisition logic 210, operating system 215, modeling environment 220, model 230, input device 240, display device 250, model representation 260, and plant 270. The system in FIG. 2 is illustrative and other embodiments of system 200 can include fewer devices, more devices, and/or devices in configurations that differ from the configuration of FIG. 2.

Computer 205 may include a device that performs processing operations, display operations, communication operations, etc. For example, computer 205 may include logic, such as one or more processing or storage devices, that can be used to perform and/or support processing activities on behalf of a user. Embodiments of computer 205 may include a desktop computer, a laptop computer, a client, a server, a mainframe, a personal digital assistant (PDA), a web-enabled cellular telephone, a smart phone, smart sensor/actuator, or another computation or communication device that executes instructions to perform one or more activities and/or to generate one or more results.

Computer 205 may further perform communication operations by sending data to or receiving data from another device (not shown in FIG. 2). Data may refer to any type of machine-readable information having substantially any format that may be adapted for use in one or more networks and/or with one or more devices. Data may include digital information or analog information. Data may further be packetized and/or non-packetized.

Acquisition logic 210 may acquire data from devices external to computer 205 and may make the data available to computer 205. For example, acquisition logic 210 may include analog-to-digital converters, digital-to-analog converters, filters, multiplexers, etc., which are used to make data available to computer 205. Computer 205 may use acquired data to perform modeling operations, controller design activities, etc.

Operating system 215 may manage hardware and/or software resources associated with computer 205. For example, operating system 215 may manage tasks associated with receiving user inputs, operating computing environment 205, allocating memory, prioritizing system requests, etc. In an embodiment, operating system 215 may be a virtual operating system. Embodiments of operating system 215 may include Linux, Mac OS, Microsoft Windows, Solaris, UNIX, etc. Operating system 215 may further run on a virtual machine, which can be provided by computer 205.

Modeling environment 220 may provide a computing environment that allows users to perform simulation or modeling tasks related to disciplines, such as, but not limited to, mathematics, science, engineering, medicine, business, etc. Modeling environment 220 may support one or more applications that execute instructions to allow a user to construct a model having executable semantics. For example, in an embodiment, modeling environment 220 may allow users to create free-form models (e.g., first, second, third, fourth, fifth, etc., order models) having executable semantics. Modeling environment 220 may further support time-based, event-based, etc., modeling activities.

Model 230 may include information for executable textual or graphical models. For example, model 240 may include information for textual models or a graphical models that can be time-based models, event-based models, state transition models, data flow models, component diagrams, entity flow diagrams, equation based language diagrams, etc. Graphical embodiments of model 230 may include entities (e.g., blocks, icons, etc.) that represent executable code for performing operations. Code for the entities may be executed to perform a simulation using the model. Entities may be connected together using lines that represent pathways for transferring data from one entity to another in the model.

Input device 240 may receive user inputs. For example, input device 240 may transform a user motion or action into a signal or message that can be interpreted by computer 205. Input device 240 can include, but is not limited to, keyboards, pointing devices, biometric devices, accelerometers, microphones, cameras, haptic devices, etc.

Display device 250 may display information to a user. Display device 250 may include a cathode ray tube (CRT), plasma display device, light emitting diode (LED) display device, liquid crystal display (LCD) device, etc. Embodiments of display device 250 may be configured to receive user inputs (e.g., via a touch sensitive screen) if desired. In an embodiment, display device 250 can display one or more graphical user interfaces (GUIs) to a user. The GUIs may include model 240 and/or other types of information.

Model representation 260 may include a visual representation of model 230 and/or a visual representation provided by model 230, e.g., a plot window. For example, model representation 260 may be displayed to a user and may include a number of entities connected by lines. When model 230 is executed, model representation 260 may change to show, for example, the flow of data through the model.

Plant 270 may include one or more devices that provide data to computer 205. For example, plant 270 may include an engine system that is monitored using sensors, such as accelerometers, thermocouples, opto-electric transceivers, strain gauges, etc. In an embodiment, acquisition logic 210 may receive signals from plant 270 in analog or digital form and may transform the signals into a form suitable for use in computer 205.

Exemplary Modeling Environment

Figure 3:
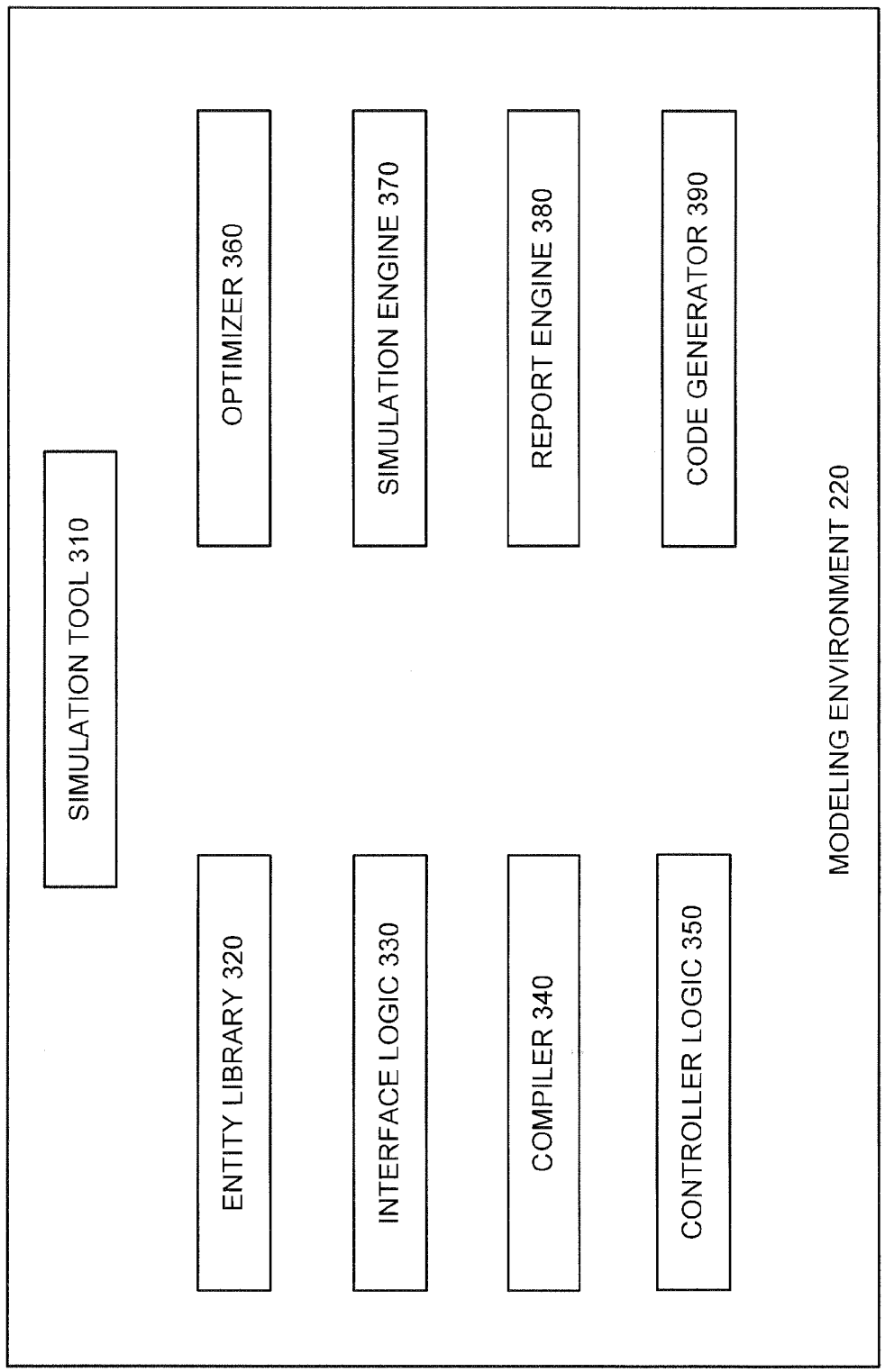
FIG. 3 illustrates an exemplary implementation of a modeling environment that can be used for implementing aspects of the invention.

FIG. 3 illustrates an exemplary embodiment of a modeling environment 220. Modeling environment 220 can include simulation tool 310, entity library 320, interface logic 330, compiler 340, controller logic 350, optimizer 360, simulation engine 370, report engine 380, and code generator 390. The embodiment of modeling environment 220 illustrated in FIG. 3 is illustrative and other embodiments of modeling environment 220 can include more entities or fewer entities without departing from the spirit of the invention.

Simulation tool 310 may be an application for building a model. Simulation tool 310 can be used to build a textual model or a graphical model having executable semantics. In the case of graphical models, simulation tool 310 may allow users to create, modify, diagnose, delete, etc., model entities and/or connections. Simulation tool 310 may interact with other entities illustrated in FIG. 2 or 3 for receiving user inputs, executing a model, displaying results, generating code, etc. Simulation tool 310 may provide a user with an editing window for constructing or interacting with textual models and/or a GUI for creating or interacting with graphical models.

Entity library 320 may include code modules or entities (e.g., blocks/icons) that a user can drag and drop into a display window that includes model representation 360. In the case of graphical models, a user may further couple entities using connections to produce a graphical model of a system, such as plant 370.

Interface logic 330 may allow modeling environment 220 to send or receive data and/or information to/from devices (e.g., plant 270, a target environment, etc.) or software modules (e.g., a function, an application program interface, etc.). In an embodiment, interface logic 330 may interface acquisition logic 310 with modeling environment 220.

Compiler 340 may compile a model into an executable format. Compiled code produced by compiler 340 may be executed on computer 205 to produce a modeling result. In an embodiment, compiler 340 may also provide debugging capabilities for diagnosing errors associated with the model.

Controller logic 350 may be used to create and implement controllers in model 330. For example, controller logic 350 may provide functionality for entities that represent types of controllers in model representation 260. When a model executes, controller logic 350 may perform control operations on the model by interacting with entities in model representation 260. In an embodiment, controller logic 350 may include control algorithms that implement controllers in model representation 360. Embodiments of controller logic 350 may be configured to operate in standalone or distributed implementations.

Optimizer 360 may optimize code, parameters, performance (e.g., execution speed), etc., for a model. For example, optimizer 360 may optimize code to cause the code to occupy less memory, to cause the code to execute more efficiently, to cause the code to execute faster, etc., than the code would execute if the code were not optimized. Optimizer 360 may also perform optimizations for controller logic 350, e.g., to optimize parameters for a controller. In an embodiment, optimizer 360 may operate with or may be integrated into compiler 340, controller logic 350, code generator 390, etc. Embodiments of optimizer 360 may be implemented via software objects that interact with other object oriented software, e.g., for receiving data on which optimizer 360 operates.

Simulation engine 370 may perform operations for executing a model to simulate a system. Simulation engine 370 may be configured to perform standalone or remote simulations based on user preferences or system preferences.

Report engine 380 may produce a report based on information in modeling environment 220. For example, report engine 380 may produce a report indicating whether a controller satisfies design specifications, a report indicating whether a controller operates in a stable manner, a report indicating whether a model compiles properly, etc. Embodiments of report engine 380 can produce reports in an electronic format for display on display device 250, in a hardcopy format, and/or a format adapted for storage in a storage device.

Code generator 390 can generate code from a model. In an embodiment, code generator 390 may receive code in a first format and may transform the code from the first format into a second format. In an embodiment, code generator 390 can generate source code, assembly language code, binary code, interface information, configuration information, performance information, task information, etc., from at least a portion of a model. For example, code generator 390 can generate C, C++, SystemC, Java, Structured Text, etc., code from the model.

Embodiments of code generator 390 can further generate Unified Modeling Language (UML) based representations and/or extensions from some or all of a graphical model (e.g., System Modeling Language (SysML), Extensible Markup Language (XML), Modeling and Analysis of Real Time and Embedded Systems (MARTE), Hardware Description Language (HDL), Automotive Open System Architecture (AUTOSAR), etc.). In an embodiment, optimizer 370 can interact with code generator 390 to generate code that is optimized according to a parameter (e.g., memory use, execution speed, multi-processing, etc.). Embodiments of modeling environments consistent with principles of the invention can further include components such as verification components, validation components, etc.

Embodiments of the invention may be used to interactively formulate and solve multivariable feedback control problems and to design controllers for use in non-linear models of substantially any order and/or delay. Embodiments can be configured to use exact linearization techniques to produce linear time invariant models that can represent at least a portion of a non-linear model.

Exemplary Control Architectures

By way of example, embodiments of the invention can be applied to control architectures having a plurality of components that can include, among other things, controller blocks, arranged in substantially any order and having one or more feedback loops.

Figure 4:
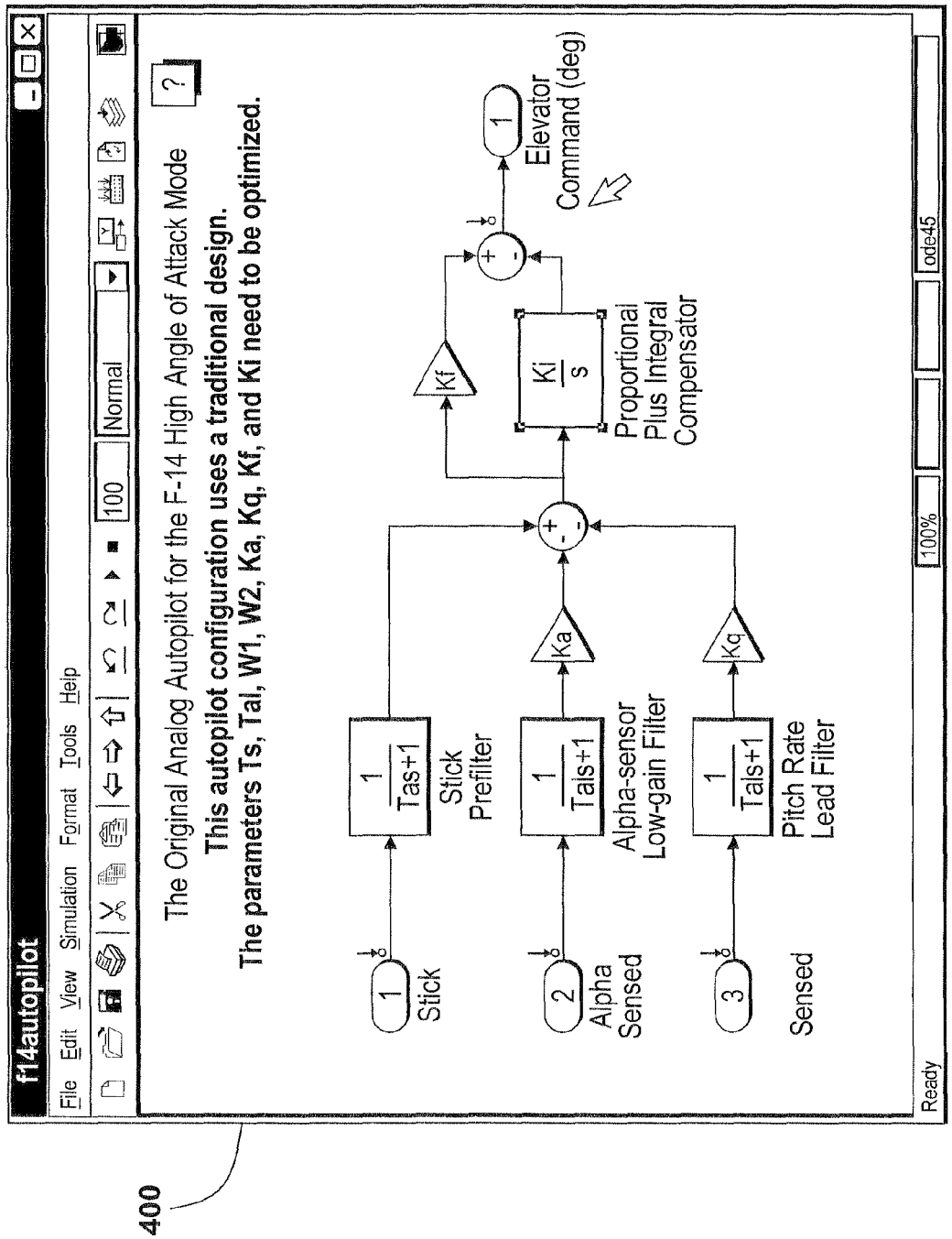
FIGS. 4-6 illustrate exemplary controller architectures to which exemplary embodiments of the invention can be applied to tune components of the architectures.

FIG. 4 illustrates an exemplary control architecture to which embodiments of the invention can be applied, namely an autopilot used in an F-14 in a high angle of attack mode. The autopilot may be displayed in GUI 400 and may contain 8 tunable parameters that include gains and time constants.

Figure 5:
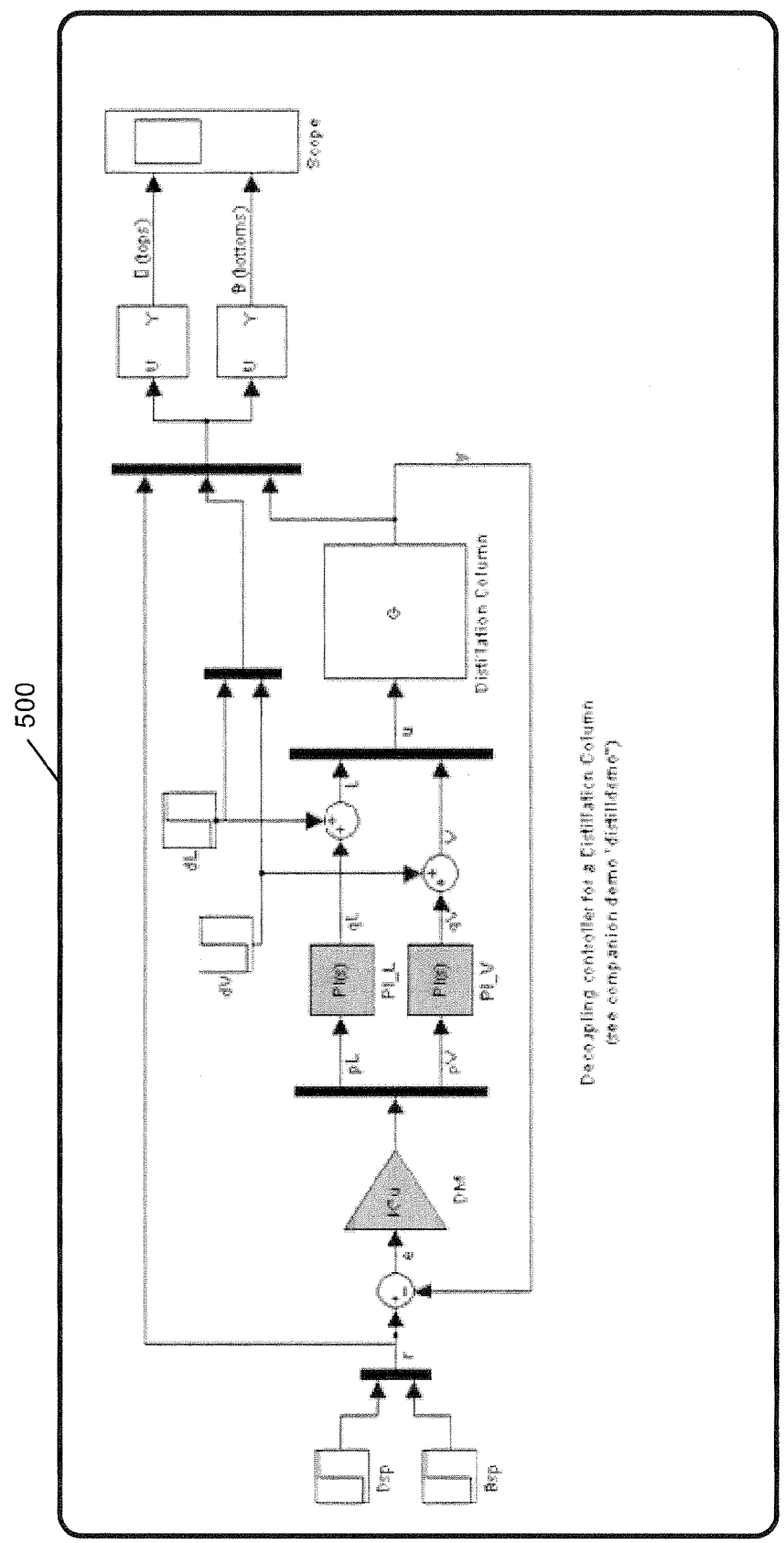

FIG. 5 illustrates an exemplary architecture for a controller used in a distillation column. The controller of FIG. 5 can be displayed to a user via GUI 500 and can include four proportional integral (PI) gains and a 2×2 gain matrix that require tuning.

Figure 6:
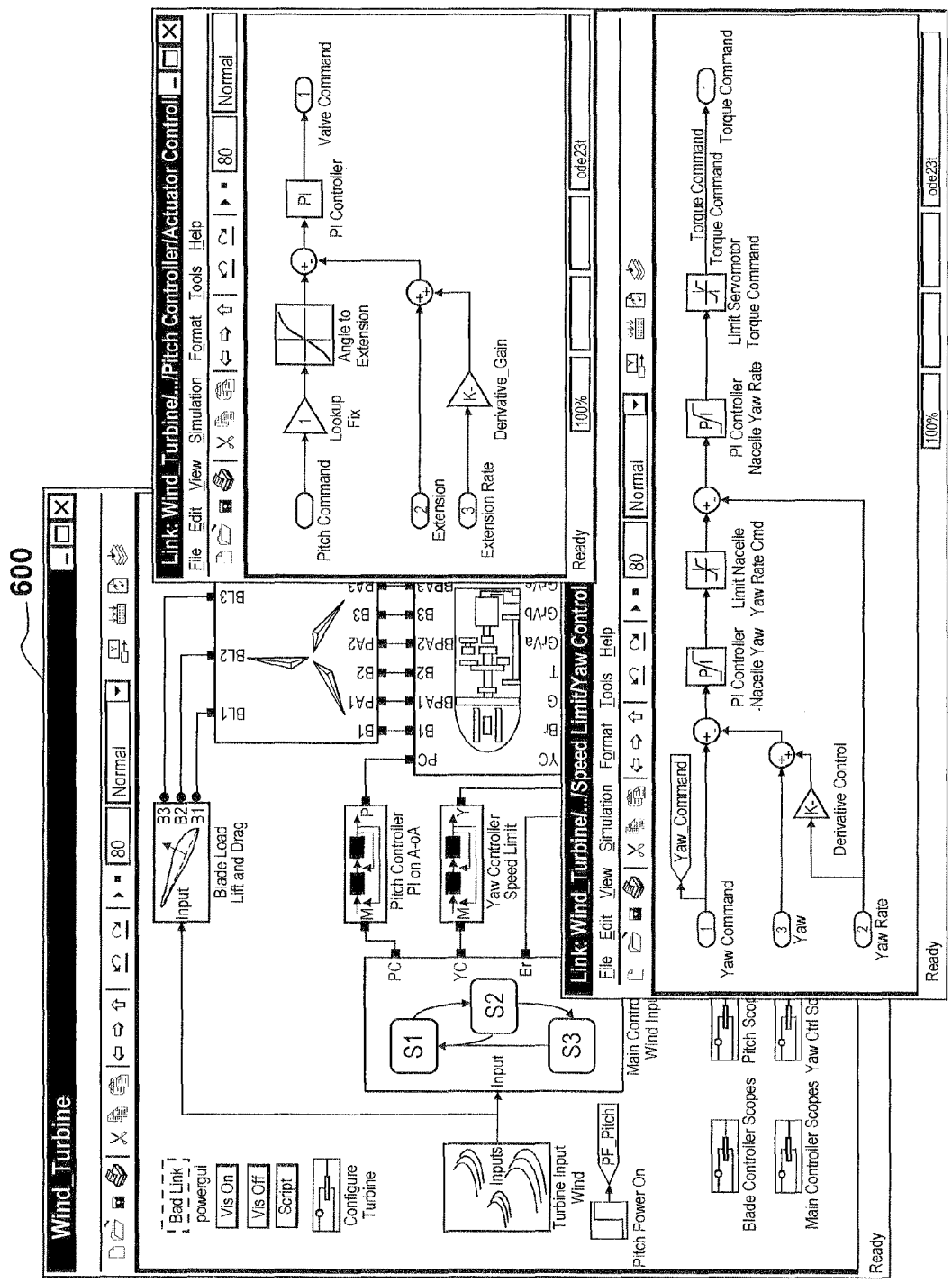

FIG. 6 illustrates an exemplary architecture for a pitch and yaw control for a wind turbine. The architecture of FIG. 6 can be displayed to a user via GUI 600 and can include three PI controllers and two gains that require tuning. As illustrated in FIG. 6, GUIs used with embodiments of the invention can include a plurality of interfaces, such as windows, panes, etc.

Exemplary embodiments of the invention can be used with still other types of architectures and with architectures that are more complex or less complex than the architectures illustrated in FIGS. 4-6 and elsewhere in the instant application.

Exemplary embodiments and/or techniques disclosed herein allow for efficient tuning of arbitrary control structures by allowing the structures to be reduced to a single generic representation.

Exemplary Canonical Structure

Figure 7:
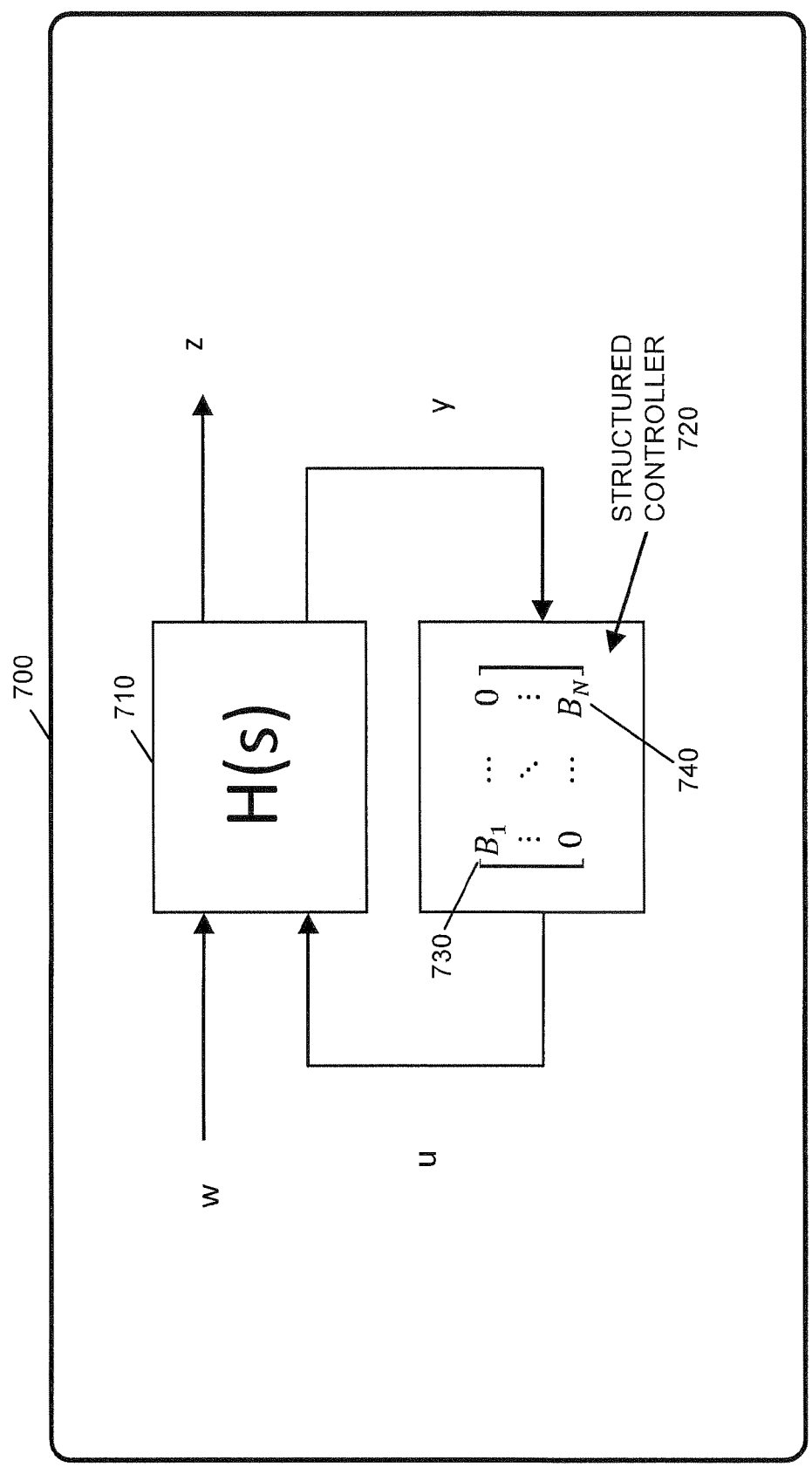
FIG. 7 illustrates an exemplary implementation of the invention that employs a structured controller for tuning parameters in conjunction with a H∞ synthesis representation of a system.

FIG. 7 illustrates an exemplary canonical structure that can be used to represent transformed arbitrary control structures.

Referring to FIG. 7, System 700 can be displayed to a user via an interface and can include H(s) 710 that can be a linear model that combines fixed components of a control system into a single lumped model. In an embodiment of the invention, H(s) 710 may represent all fixed control components of a system. System 700 may further include controller 720 that can include elements to be tuned. For example, in an exemplary embodiment, controller 720 can be a structured controller that includes one or more blocks, $B_1$ 730 to $B_N$ 740, that represent control elements to be tuned. By way of example, when controller 720 includes a single block the block is referred to as $B_1$, and a controller 720 having three blocks will include blocks, $B_1$, $B_2$ and $B_3$. Control elements to be tuned can vary in design. For example, elements to be tuned can include gains, dynamic elements (e.g., transfer functions, state-space models, etc.) and/or design parameters in the plant or controller.

Exemplary embodiments of controller 720 may include a block-diagonal aggregate of blocks $B_1$ to $B_N$ and may be referred to as a structured controller 720. Structured controllers 720 can include blocks that are repeated (i.e., a particular block, such as $B_2$, may appear multiple times along the diagonal).

System 700 may be represented using corresponding equations in the frequency domain, such as:

$$\begin{cases} \begin{bmatrix} z \\ y \end{bmatrix} = H(s) \begin{bmatrix} w \\ u \end{bmatrix} \\ u = \begin{bmatrix} B_1(s) & \cdots & 0 \\ \vdots & \ddots & \vdots \\ 0 & \cdots & B_N(s) \end{bmatrix} y \end{cases} \quad \text{(Eq. 1)}$$

In Eq. 1, H(s) and the tuned blocks ($B_1$ to $B_N$) interact in a feedback fashion through the signals u and y. The canonical structure of Eq. 1 has three properties:

(1) signal-flow diagrams where $B_1, \ldots, B_N$ appear as blocks can be transformed to this canonical structure by separating the blocks $B_1, \ldots, B_N$ from the rest of the diagram and appending their inputs and outputs to create the block-diagonal structure $$C(s) = \begin{bmatrix} B_1 & \cdots & 0 \\ \vdots & \ddots & \vdots \\ 0 & \cdots & B_N \end{bmatrix} \quad \text{(Eq. 2)}$$

(2) transfer function or state-space models whose coefficients are rational functions of some parameters $p_1, \ldots, p_N$ can be transformed to this canonical form where the blocks $B_1, \ldots, B_N$ are of the form $$B_j = \begin{bmatrix} p_j & \cdots & 0 \\ \vdots & \ddots & \vdots \\ 0 & \cdots & p_j \end{bmatrix} \quad \text{(Eq. 3)}$$

(3) this canonical representation is closed under series, parallel, and feedback interconnection, meaning that any interconnection of such canonical structures yields another canonical structure with a bigger block list.

The above properties, (1)-(3), ensure that any method for tuning the canonical structure of FIG. 7 consistent with principles of the invention is applicable to virtually any control structure with linear control elements of any order and structure.

Exemplary Technique for Parameterizing Tunable Blocks

Exemplary embodiments can be configured to parameterize tunable elements in a system to formulate a tuning task as an optimization problem. For example, in an embodiment, all tunable elements in a system may be parameterized. Table 1 summarizes the parameterization of some common control elements, such as a proportional integral derivative (PID) block, a fixed-order transfer function block, and a fixed-order state-space block.

TABLE 1

Parameterization of selected control elements

| Tunable control element | Parameterization |
|---|---|
| Gain block | Every entry of the gain matrix is a parameter |
| PID block $B(s) = K_p + \frac{K_i}{s} + \frac{K_d s}{1 + T_f s}$ | Kp, Ki, Kd, and Tf are the parameters |
| Fixed-order transfer function block $B(s) = \frac{b_m s^m + \cdots + b_0}{s^n + a_{n-1} s^{n-1} + \cdots + a_0}$ | The numerator and denominator coefficients are the parameters |
| Fixed-order state-space block $B(s) \begin{cases} \dot{x} = Ax + Bu \\ y = Cx + Du \end{cases}$ | The entries of the A, B, C, D matrices are the parameters. By default we restrict A to be tri-diagonal, which is fully general and reduces the number of parameters needed. |

Exemplary embodiments can further be configured to provide and/or use software-based tools to allow users to create custom parameterizations of control elements by writing expressions involving basic parameters. For example, an exemplary software tool used in an embodiment of the invention can allow a user to create tunable blocks with additional structures, such as, but not limited to:

A low-pass filter a/(s+a) parameterized by the real value a

A state-space controller in observer form:

$$\begin{cases} \dot{x} = Ax + Bu + L(y - Cx - Dy) \\ u = -Kx \end{cases} \quad \text{(Eq. 4)}$$

In Eq. 4, the parameters are the gain matrices K and L.

Exemplary Technique for Multiobjective Support

By way of example, two H∞ constraints may be provided, namely $$\|T_1\|_\infty < 1, \|T_2\|_\infty < 1$$

involving two separate closed-loop transfer functions $$\begin{cases} T_1 = F(H_1, C) \\ T_2 = F(H_2, C) \end{cases} \quad \text{(Eq. 5)}$$

where F(.,.) denotes the linear fractional transformation (LFT) interconnection depicted in FIG. 7 and $$C(s) = \begin{bmatrix} B_1 & \cdots & 0 \\ \vdots & \ddots & \vdots \\ 0 & \cdots & B_N \end{bmatrix} \quad \text{(Eq. 2)}$$

represents the structured compensator to be tuned.

The two H∞ constraints ($\|T_1\|_\infty < 1, \|T_2\|_\infty < 1$) can be combined into the single H∞ constraint $$\|T\|_\infty < 1$$

on the aggregate transfer function $$T(s) = F\left(\begin{bmatrix} T_1 & 0 \\ 0 & T_2 \end{bmatrix}, \begin{bmatrix} C & 0 \\ 0 & C \end{bmatrix}\right) \quad \text{(Eq. 6)}$$

Even when C(s) is a full-order multiple input multiple output (MIMO) controller, conventional H∞ synthesis techniques cannot solve the resulting problem because of the $$\begin{bmatrix} C & 0 \\ 0 & C \end{bmatrix}$$

block-diagonal structure of the resulting controller.

In contrast, exemplary embodiments of the invention support $$\begin{bmatrix} C & 0 \\ 0 & C \end{bmatrix}$$

block-diagonal structure as well as block repetition. Therefore, exemplary embodiments of the invention can be used for solving problems on which conventional H∞ synthesis techniques fail, such as the multi-objective problem:

Tune C(s) so that $\|T_1\|_\infty < 1$ and $\|T_2\|_\infty < 1$ or equivalently, Tune C(s) so that $\|T\|_\infty < 1$ is no different than solving a single-objective problem. From a practical standpoint, exemplary embodiments allow users to independently constrain each loop transfer function so that the user does not have to come up with a single MIMO constraint that captures all requirements. This is a desirable feature to many users because coming up with a single MIMO constraint capturing all requirements is typically a challenging task for users because of cross-terms interfering with the way users set up problems.

Exemplary Technique for Automatically Formulating Loop Shaping Requirements

Loop Shaping is a popular frequency-domain technique for tuning feedback control systems. By way of example, for a single input single output (SISO) feedback loop, the loop shaping procedure can consist of:

1. Expressing the design requirements in terms of desired gain profile for the open-loop response L(s) (gain as a function of frequency). For example, the gain should be high (>1) at low frequency for good tracking and disturbance rejection, and the gain should be low (<1) at high frequency for insensitivity to noise and modeling errors. The transition frequency (gain=1) is called the crossover frequency $\omega_c$ and directly influences the speed of response of the control system.
2. Adjusting the tunable parameters of the compensator to approach the desired loop shape while maintaining closed-loop stability and adequate stability margins For multi-loop control systems, this procedure can be applied to the MIMO open-loop response with some adjustments as discussed below.

Step (1), immediately above, is usually well-understood by control engineers familiar with frequency-domain techniques. For example, a desired loop shape for a feedback loop with integral action may be represented by plot 800 illustrated in FIG. 8. In an embodiment, plot 800 may be displayed to a user via a GUI using display device 250.

Figure 8:
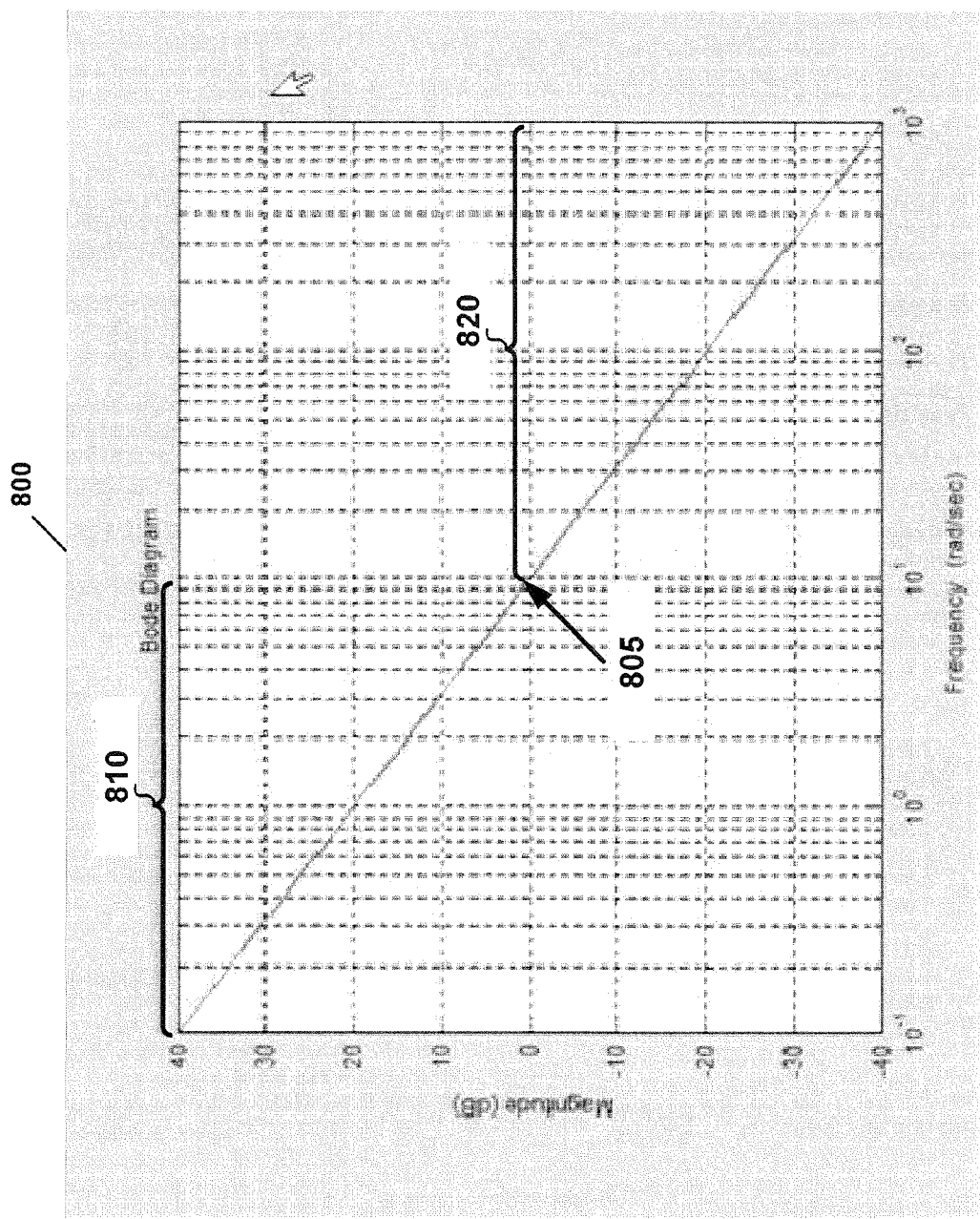
FIG. 8 illustrates an exemplary desired loop shape for a feedback loop used in connection with an embodiment of the invention.

Referring to FIG. 8, the 0 dB crossover frequency is $\omega_c = 10$ ($\omega_c$ is at callout 805 in FIG. 8), which corresponds to a response time of about $1/10 = 0.1$ second. In FIG. 8, the response time may refer to how fast the feedback loop reacts to changes. Increasing or decreasing $\omega_c$ can speed up or slow down, respectively, the response. The loop shape in FIG. 8 has high gain for w<10 (region 810) and low gain for w>10 (region 820).

Exemplary embodiments and techniques are suited for adjusting tunable parameters of compensators in a system to arrive at or near a desired loop shape. Techniques used with embodiments of the invention may benefit from formulating the loop shaping goal (i.e., shaping the open-loop gain to match a specified profile) into some H∞ norm constraint. There are several known techniques for formulating the loop shaping goal in an H∞ norm constraint; however, such a translation often stymies engineers not trained in robust control theory and H∞ synthesis. Exemplary embodiments employ a technique that simplifies the reformulation step so as to remove difficulties faced by engineers (e.g., users) when employing conventional approaches. For example, embodiments may automate the reformulation step to remove configuration and/or computing burdens from the user.

Figure 9:
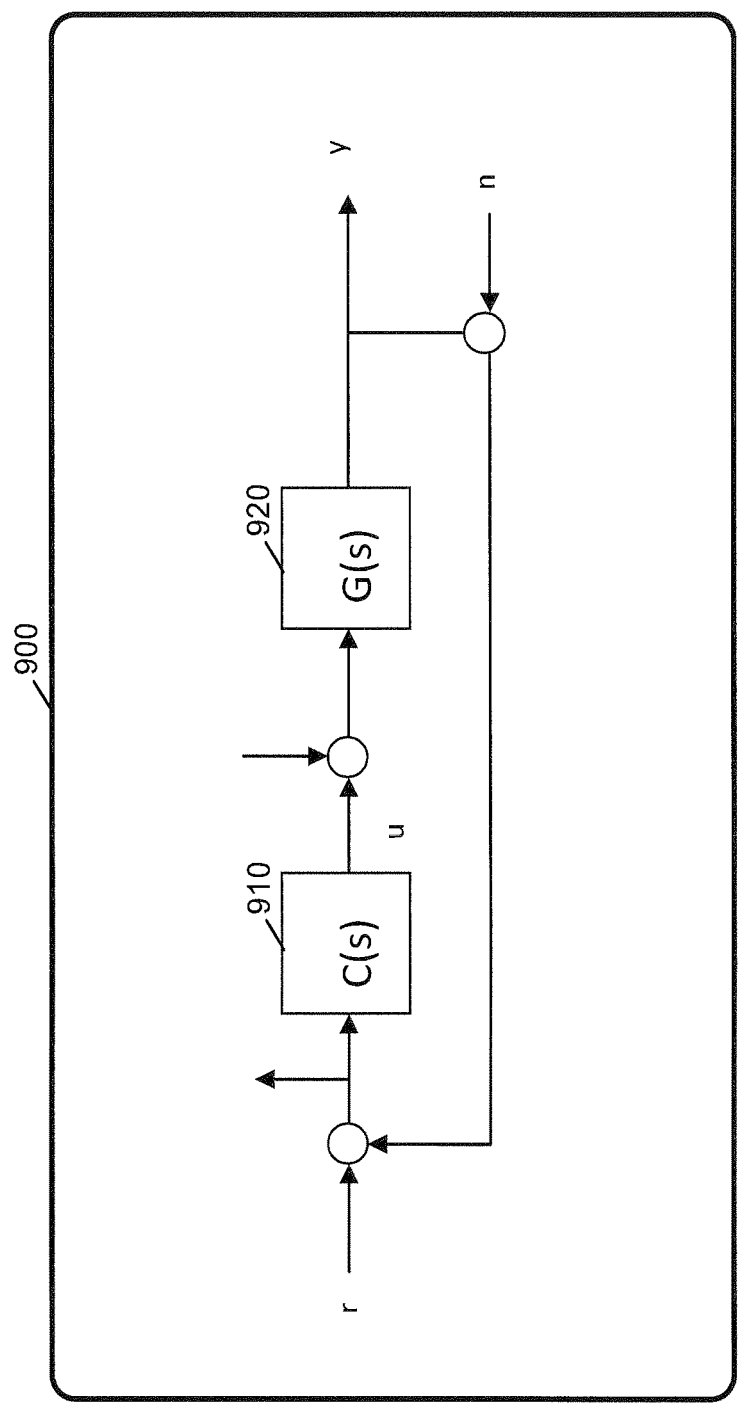
FIG. 9 illustrates an exemplary configuration including a plant and controller having tunable elements to which exemplary techniques can be applied for tuning the components.

FIG. 9 illustrates a system 900 that can be used for implementing aspects of the invention. System 900 can include a SISO and MIMO feedback loop along with input signal r, output signal y, controller C(s) 910, and plant G(s) 920. System 900 further includes signals u and n. In FIG. 9, C(s) 910 may include one or more tunable blocks and signals u and y may be assumed to include the same number of entries (i.e., the same number of controls and measurements).

In FIG. 9, the open-loop transfer function can be represented as:

$$L = GC \quad \text{(Eq. 7)}$$

and the closed-loop transfer functions are:

$$\begin{bmatrix} y \\ e \end{bmatrix} = \begin{bmatrix} T & -T & GS \\ S & -S & GS \end{bmatrix} \begin{bmatrix} r \\ n \\ d \end{bmatrix} \quad \text{(Eq. 8)}$$

with the notation:

$$S = (I+L)^{-1}, T = LS \quad \text{(Eq. 9)}$$

Given a target loop shape ρ(s) and a disturbance rejection factor β, consider $$X(s) = \begin{bmatrix} 1 & 0 \\ 0 & \rho \end{bmatrix} \begin{bmatrix} T & -T & GS \\ S & -S & GS \end{bmatrix} \begin{bmatrix} 1 & 0 & 0 \\ 0 & \frac{1}{\rho} & 0 \\ 0 & 0 & \frac{1}{\beta} \end{bmatrix} \quad \text{(Eq. 10)}$$

It can be verified that the H∞ constraint $$\|X\|_\infty < 1$$

ensures that:

$$\begin{cases} \|S(j\omega)\| < \min\left(1, \frac{1}{\rho(\omega)}\right) \\ \|T(j\omega)\| < \min(1, \rho(\omega)) \\ \|GS(j\omega)\| < \beta \min\left(1, \frac{1}{\rho(\omega)}\right) \end{cases} \quad \text{(Eq. 11)}$$

Because
$S \approx 1/L$ and $T \approx 1$ where the loop gain $\|L(j\omega)\|$ is greater than 1
$T \approx L$ and $S \approx 1$ where the loop gain is smaller than 1
this is equivalent to:

$$\begin{cases} \|L(j\omega)\| > \rho(\omega) \text{ where } \|L(j\omega)\| > 1 \\ \|L(j\omega)\| < \rho(\omega) \text{ where } \|L(j\omega)\| < 1 \\ \|S(j\omega)\| < 1 \\ \|T(j\omega)\| < 1 \\ \|GS(j\omega)\| < \beta \min\left(1, \frac{1}{\rho(\omega)}\right) \end{cases} \quad \text{(Eq. 12)}$$

The first two constraints of Eq. 12 enforce a desired loop shape by making the loop gain large enough or small enough away from the crossover frequency. For example, an implementation may include desired values for the loop gain, such as an upper value and a lower value away from the crossover frequency. The third and fourth constraints of Eq. 12 may operate to keep the gain of S and T close to 1 near crossover, which is important to ensure adequate overshoot and stability margins. Finally, the last constraint of FIG. 12 lets users improve disturbance rejection properties by decreasing β.

Summarizing the above discussion with respect to FIG. 9, it has been illustrated that the H∞ constraint $$\|X\|_\infty < 1$$

impresses the desired loop shape, provides adequate margins, and optimizes disturbance rejection through β. This provides a systematic way to translate loop shaping objectives into an H∞ constraint suitable for use with exemplary techniques of the invention. For example, exemplary embodiments and techniques allow for the creation of software tools that can operate using only the following basic information from users, such as:

The target loop shape ρ(s) (in an embodiment, only the gain may matter)
The tunable blocks
The location of the signals r, d, y in the block diagram of the closed-loop system From this information, software tools implementing aspects of the invention can automatically extract G and C, construct X(s), and tune the block parameters using structured H∞ synthesis techniques consistent with aspects of the invention. These software tools and techniques can further eliminate the need for a target loop shape ρ(s) by automatically generating an adequate loop shape from the desired crossover frequency $\omega_c$ and by determining whether integral action is needed.

Software implemented aspects of the invention can also apply to MIMO problems. For example, exemplary techniques can be applied to the control of a robot arm with four separate feedback loops, each controlling a particular joint. In the MIMO case, a refinement can consist of using a loop shape that may differ from the loop shape used with SISO problems.

Figure 10:
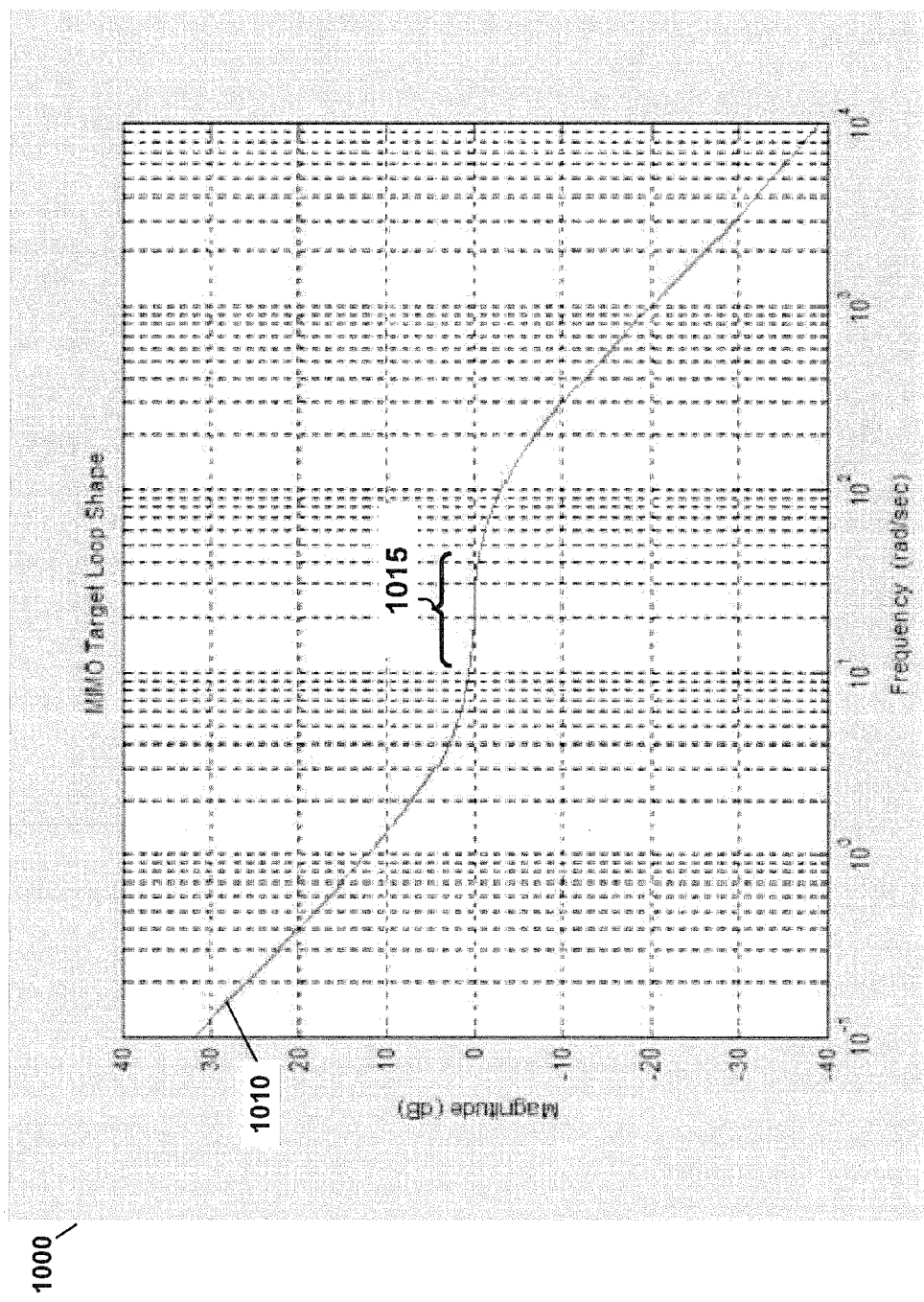
FIG. 10 illustrates an exemplary desired loop shape for use with a multiple input multiple output control problem that can be tuned using an embodiment of the invention.

FIG. 10 illustrates a loop shape 1000 that can be used to address MIMO problems in accordance with aspects of the invention. In FIG. 10, trace 1010 includes a flattened portion 1015 having on the order of 0dB gain. Flattened portion 1015 allows for a range of crossover frequencies. Allowing a range of crossover frequencies can help account for the fact that in coupled multi-loop control systems, it may not be possible for all loops to cross 0dB at the same frequency.

Exemplary Software-Based Tools for Implementing Aspects of the Invention

Exemplary embodiments of the invention can be implemented in software for practicing techniques described herein. Software implemented embodiments of the invention provide users with interfaces, such as graphical user interfaces (GUIs) that allow users to enter information in formats and using terminologies readily understood by typical users. Software implemented embodiments further employ algorithms and processing techniques that support rapid design and/or analysis of control systems. In fact, embodiments of the invention can be configured to support interactive control design and analysis applications that allow users to utilize workflows that encourage efficient design and analysis of control systems.

For example, when exemplary embodiments employ one or more software tools for implementing techniques described herein, software tools can provide users with services such as, but not limited to:
1. Specifying the structure of control elements and automatically generating a parameterization of the elements;
2. Creating custom elements and parameterizations;
3. Mapping a given control architecture to a corresponding canonical structure of FIG. 7;
4. Translating simple design requirements into H∞ constraints;
5. Automatically tuning control elements by solving the underlying structured H∞ synthesis problem;
6. Presenting results in terms of an original control element; and
7. Facilitating validation of the design through tight integration with the ordinary linear analysis tools.

For clarity of presentation, exemplary embodiments and techniques are described in connection with the MATLAB programming language and/or MATLAB language compatible toolboxes, such as MathWorks' control system toolbox. Embodiments of the inventions and/or techniques associated with the embodiments can be implemented in other programming environments, using other software packages and/or applications, etc., without departing from the spirit of the invention. For example, embodiments and/or techniques can be implemented using applications including, but not limited to, MATLAB-compatible products/languages, Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; C/C++ libraries; etc.

In some embodiments, the environment for implementing techniques of the invention may include hardware or hardware/software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

In one implementation, the environment can include a dynamically typed language that can be used to express problems and/or solutions in mathematical notations familiar to those of skill in the relevant arts. For example, the environment may use an array as a basic element, where the array may not require dimensioning. These arrays may be used to support array programming in that operations can apply to an entire set of values, such as values in an array. Array programming may allow array based operations to be treated as a high-level programming technique or model that lets a programmer think and operate on whole aggregations of data without having to resort to explicit loops of individual non-array, i.e., scalar operations.

The environment may further be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

When desired, embodiments and techniques consistent with aspects of the invention may be implemented in a graphically-based environment using products such as, but not limited to, the Simulink® modeling environment, the Stateflow® environment, the SimEvents™ environment, etc., by The MathWorks, Inc.; Simulink/Stateflow/SimEvents-compatible products; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment.

Exemplary Techniques for Specifying Tunable Blocks

Embodiments of the invention may allow a user to specify tunable blocks in a system, where tunable blocks are components of the control system that must be tuned for optimal performance and robustness. For example, tunable components of the control system can correspond to the blocks $B_1, \ldots, B_N$ in the canonical structure of FIG. 7 in an embodiment of the invention.

Exemplary embodiments may use objects for controlling elements such as gains, PIDs, transfer functions, and state-space models. The objects may further be used to account for tunable parameters and to allow users to initialize, set (e.g., fix), or free parameters.

By way of example, a user may interact with an interface, such as a textual user interface, for creating a tunable gain having two inputs and one output. Modeling environment 220 may generate interface 1100. For example, interface 1100 may be a textual editing window displayed to a user via display device 250. Referring to FIG. 11, in an exemplary embodiment, the user may enter command 1105 at a prompt (e.g., >>).

In response to command 1105, modeling environment 220 may return an object G 1110 that can be displayed to the user via interface 1100. In an embodiment, modeling environment 220 may be configured to display object G 1110 in a format that is similar to a format used to display other types of objects compatible with modeling environment 220. For example, object G 1110 may be similar to ordinary linear time invariant (LTI) objects in a control system toolbox, except for the "Gain" property which may include a description of the tunable parameters rather than a numeric value. For example, and referring to FIG. 12, a user may enter command 1205 and modeling environment 220 may return answer 1210 that can include values for G.Gain.

Still referring to FIG. 12, answer 1210 may include default values for G.Gain. In an exemplary embodiment, default values may be current values that are used with modeling environment 220 until a user changes one or more values from the default value to another value. For example, a default/current "value" of gain is [0 0] in answer 1210. A user may be able to set the first entry of the gain matrix to 1 by entering commands 1215 and 1220. For example, the user may enter:
>>G.Gain.Value(1)=1
>>G.Gain.Free(1)=false The user may then enter G.Gain and modeling environment 220 may return output 1225. In FIG. 12, output 1225 may display a parameterization of the gain matrix that reflects this new constraint (i.e., changing "value" from a default setting to a user specified setting).

Exemplary embodiments may allow users to create other types of blocks, such as tunable PID block, transfer function block, or state-space block using commands 1305, 1310, and 1315, respectively, shown in FIG. 13 within interface 1300.

Exemplary embodiments can provide users with pre-defined blocks that may address typical, or mainstream, needs. For some users, pre-defined blocks may be adequate to satisfy their needs. However, other users may have different needs, such as a need for more sophisticated and/or robust control elements, such as blocks having more structure as compared to structure in pre-defined blocks.

Exemplary embodiments can be adapted to support the needs of users requiring blocks that differ from pre-defined blocks, such as low-pass filter blocks, notch filter blocks, state-space models in observer form, etc. For example, embodiments can be configured to provide a suite of blocks that differ from pre-defined blocks; however, the suites may need to include a large number of blocks to satisfy the needs of certain users. In an embodiment of the invention, a framework is provided to users that allows the users to construct their own parameterization using simple algebra. This framework eliminates the need to maintain a large suite of blocks that attempts to cover all the needs of users.

In an embodiment, the framework may include:
1. A "parameter" object that embodies the basic notion of parameter; and
2. A computer algebra that automatically transforms ordinary operations on parameters into the canonical structure of FIG. 7.

By way of example, consider the low-pass filter:

$$F(s) = \frac{a}{s+a} = \frac{\frac{a}{s}}{1+\frac{a}{s}} \quad \text{(Eq. 13)}$$

where a is a real parameter. Eq. 13 is a first-order transfer function; however, the transfer-function block introduced above (FIG. 13, command 1310) cannot express the constraint that the same coefficient a appears in both numerator and denominator (in other words, that the DC gain is constrained to 1). In an exemplary embodiment, a user can specify this control element by entering commands 1320 (FIG. 13), such as:
>>s=tf('s');
>>a=realp('a',2);
>>F=feedback(a/s,1)

Commands 1320 are processed by modeling environment 220, and a @genss object "F" is returned, where the returned object embodies the canonical structure of FIG. 7 with "a" as sole block. A user may type command 1325 into interface 1300 and modeling environment 220 may return answer 1330, such as:
ans=
   a: [1×1 realp]

Embodiments of the invention can use a syntax for creating F that is the same as if "a" were just an ordinary double value. This feature eliminates the need for users having to learn a new API for interacting with parameters. By way of example, the syntax for manipulating ordinary LTI objects in the control system toolbox is seamlessly extended to handle parameters and parametric models. Embodiments of the invention can also support alternative syntaxes for interacting with parameters when desired. For example, an alternative syntax for specifying the parametric low-pass filter F(s) can be expressed via commands 1335 (FIG. 13), such as:
>>a=realp('a',2);
>>F=tf(a,[1 a])

The alternative syntax of commands 1335 is also similar (i.e., parallels) the syntax for creating an ordinary transfer function in Control System Toolbox, which is expressed via commands 1340, such as:
>>a=2;
>>F=tf(a,[1 a])

Entering commands 1335 or 1340 may return answer 1345, which display the resulting transfer function via interface 1300.

Embodiments of the invention can be used to solve control problems of a more complex nature as compared to the example above. By way of example, a state-space controller in observer form can be provided as:

$$\begin{cases} \dot{x} = Ax + Bu + L(y - Cx - Dy) \\ \quad u = -Kx \end{cases} \quad \text{(Eq. 14)}$$

In Eq. 14, A, B, C, D are known matrices and the tunable variables are the gain matrices K (state-feedback gain) and L (observer gain). This structured state-space parameterization of controllers is useful, e.g., for gain scheduling. For illustration purposes, when using an embodiment of the invention, it can be assumed there are two measurements y, one control signal u, and three states x. A user may create this tunable block by typing command 1410 (FIG. 14), such as:
>>K=realp('K',zeros(1,3));
>>L=realp('L',zeros(3,2));
>>OBC=ss(A−B*K−L*C+L*D*K,L,−K,0)

The user may then type command 1420, such as:
>>OBC.Blocks

Modeling environment 220 may process the command and may display answer 1430 via interface 1400, such as:
ans=
   K: [1×3 realp]
   L: [3×2 realp]

As with the example discussed in connection with FIG. 13, the example discussed in connection with FIG. 14 employs a syntax similar (i.e., that substantially mirrors) the syntax for creating ordinary state-space models in modeling environment 220. In an embodiment, the result of entering the commands of FIG. 14 is a @genss model encapsulating the canonical structure of FIG. 7, having the structure compensator:

$$C(s) = \begin{bmatrix} K & 0 & 0 & 0 & 0 & 0 \\ 0 & K & 0 & 0 & 0 & 0 \\ 0 & 0 & K & 0 & 0 & 0 \\ 0 & 0 & 0 & L & 0 & 0 \\ 0 & 0 & 0 & 0 & L & 0 \\ 0 & 0 & 0 & 0 & 0 & L \end{bmatrix} \quad \text{(Eq. 15)}$$

Referring back to FIG. 7, there are two pieces to the canonical structure of FIG. 7, namely (1) the interconnection model H(s), and (2) the tunable blocks $B_1, \ldots, B_N$. FIGS. 8-14 and the accompanying text have discussed tools and techniques for specifying the tunable blocks (item (2) in the preceding sentence). Tools and techniques for building the interconnection model H(s) are discussed below.

Exemplary Technique for Deriving a Canonical Structure

Exemplary embodiments and techniques can be used to support two or more approaches. For example, embodiments and techniques can support (1) automatically extracting H(s) using tools that exist within a modeling environment (e.g., a graphical modeling environment such as the Simulink modeling environment, a Simulink-compatible environment, etc.). For example, H(s) can be automatically extracted using existing linearization tools in the Simulink modeling environment. And, (2) H(s) can automatically be built using standard commands associated with a textual computing and/or modeling environment (e.g., the MATLAB programming environment, a MATLAB-compatible environment, etc.). For example, H(s) can be built using commands for building block diagrams by a user interacting with the MATLAB programming environment.

Exemplary embodiments can be used to specify tunable blocks in graphically-based environments, such as graphical modeling environments. By way of example, a user may interact with a Simulink modeling environment to specify tunable blocks for use in control systems.

In the Simulink environment, H(s) may be fully determined by the knowledge of (1) the blocks $B_1, \ldots, B_N$ to be tuned (FIG. 7), and (2) the external I/O signals w and z (FIG. 7). When the tunable blocks appear as Simulink blocks in the block diagram, this information is readily provided as:

1. A list of block paths to each of the blocks $B_1, \ldots, B_N$; and
2. Linearization input and output points specifying where the signals making up w and z enter and exit the block diagram.

Once this information is specified, a command like LIN-LFT can compute and return H(s) as an LTI model. The above procedure can be applied to linear and nonlinear models. When the procedure is applied to nonlinear models, a linearized model of the control architecture is produced.

The derivation of H(s) in a textual programming environment, such as the MATLAB environment, may rely on the computer algebra discussed above for the specification of tunable blocks (e.g., FIGS. 11-14 and accompanying text).

Exemplary embodiments make it possible for users to extend typical operations for combining ordinary LTI models (e.g., as may be done with MathWorks control system toolbox) to also handle parameter objects, parametric blocks, and the type of parametric LFT models shown in FIG. 7. Examples of some typical operations can include, but are not limited to, Ordinary algebra: plus, minus, multiply, divide, inverse, etc; and Interconnection operations: input or output concatenation, append, parallel, series, feedback, lft, connect, etc.

Exemplary embodiments make use of an object-oriented framework and the notions of static and dynamic linear fractional transform (LFT) models (defined as the LFT interconnection of a matrix or LTI model with a block-diagonal arrangement of tunable blocks, as shown in FIG. 7). Exemplary embodiments may create an object system that allows users to combine double arrays, LTI models, parameters, tunable blocks, and LFT models. For example, LFT models are the most general models and can be of three types, such as @genmat, @genss, and @genfrd, that correspond to three different numerical representations of H, such as double array, state-space model, frequency response data model, respectively. A resulting object system is closed and substantially any combination of LTI models with tunable (parametric) elements will produce a @genss or @genfrd model with the canonical structure of FIG. 7.

Figure 15:
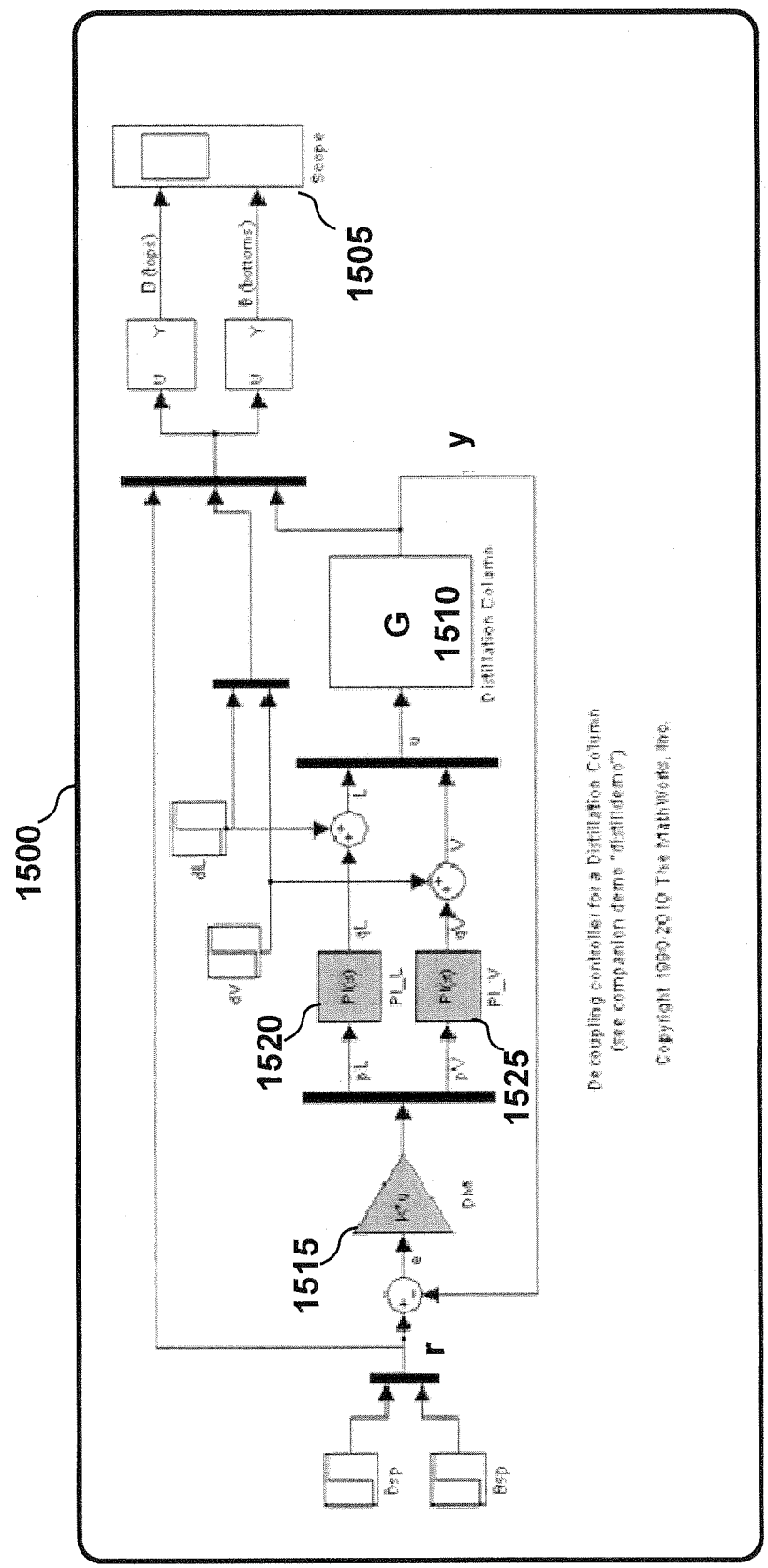
FIG. 15 illustrates an exemplary controller having tunable components that can be tuned using an embodiment of the invention.

FIG. 15 illustrates an executable graphical model 1500 that can be interacted with using the object based framework provided by exemplary embodiments of the invention. FIG. 15 may include model 1500 that can include a plurality of executable blocks. Some blocks in model 1500 may not be tunable, such as scope block 1505 and distillation column (plant) block 1510 (hereinafter plant block 1510). In contrast, other blocks in model 1500 may be tunable, such as gain block 1515 and PI controller blocks 1520 and 1525. Embodiments of modeling environment 220 can be configured to indicate tunable blocks using a first type of visual identifier (e.g., line width, shading, color, fill pattern, text pattern, etc.) and to indicate non-tunable blocks using a second type of visual identifier.

Still referring to FIG. 15, an LTI model G of plant block 1510 can be provided in model 1500 and a user may be able to interact with model 1500 to construct an LFT model of the closed-loop transfer from r toy. For example, the user may enter commands 1605 and 1610 in interface 1600 (FIG. 16A), such as:

```
% Specify tunable blocks
>> DM = ltiblock.gain('Decoupler',eye(2));
>> PI_L = ltiblock.pid('PI_L','pi');
>> PI_V = ltiblock.pid('PI_V','pi');
and
% Derive closed-loop transfer T
>> C = append(PI_L,PI_V) * DM;
>> T = feedback(G * C , eye(2));
```

Modeling environment 220 may process commands 1605 and 1610 and may produce a @genss model T. A user may interact with modeling environment 220 and may decompose model T into its part H and B (as in FIG. 7) by entering command 1615, such as:
>>[H,B]=getLFTModel(T)

Modeling environment 220 may process command 1615 and may return answer 1620, such as:

| a = | | |
|---|---|---|
| | x1 | x2 |
| x1 | −0.01333 | 0 |
| x2 | 0 | −0.01333 |

| b = | | | | | | |
|---|---|---|---|---|---|---|
| | u1 | u2 | u3 | u4 | u5 | u6 |
| x1 | 0 | 0 | 2 | 0 | 0 | 0 |
| x2 | 0 | 0 | 0 | 2 | 0 | 0 |

| c = | | |
|---|---|---|
| | x1 | x2 |
| yD | 0.5853 | −0.576 |
| yB | 0.7213 | −0.7307 |
| ? | −0.5853 | 0.576 |
| ? | −0.7213 | 0.7307 |
| ? | −0.5853 | 0.576 |
| ? | −0.7213 | 0.7307 |

| d = | | | | | | |
|---|---|---|---|---|---|---|
| | u1 | u2 | u3 | u4 | u5 | u6 |
| yD | 0 | 0 | 0 | 0 | 0 | 0 |
| yB | 0 | 0 | 0 | 0 | 0 | 0 |
| ? | 1 | 0 | 0 | 0 | 1 | 0 |
| ? | 0 | 1 | 0 | 0 | 0 | 1 |
| ? | 1 | 0 | 0 | 0 | 0 | 0 |
| ? | 0 | 1 | 0 | 0 | 0 | 0 |

Continuous-time model.

| B = |
|---|
| [1x1 ltiblock.pid] |
| [1x1 ltiblock.pid] |
| [2x2 ltiblock.gain] |

Exemplary Technique for Optimizing Tunable Parameters

Once a user has interacted with model 1500 and modeling environment 220 to formulate the design requirements as an H∞ constraint $\|T(s)\|_\infty < 1$ in terms of some weighted closed-loop model T(s), the user may invoke an optimizer by entering a command, such as:
>>T=hinfstruct(T0,options)
where T0 is the un-tuned closed-loop model and options is some option set for the optimizer. Modeling environment 220 may process the command and may return a tuned closed-loop model T where tunable parameters are set to certain values found by the optimizer. For example, in an embodiment all tunable parameters may be set to a best values as determined by optimizer 360.

A user may wish to access tuned values for one or more tunable blocks. For example, in an embodiment, a user may access tuned values of each tunable block by entering a command, such as:
>>T.Blocks In certain situations, C0 may consist of a compensator that includes one or more tunable blocks. In these situations, a user can "push" tuned parameter values to the LFT model for C0 using an exemplary embodiment of the invention. For example, the user may type a command, such as:
>>C=replaceBlock(C0,T.Blocks)
Modeling environment 220 may process the command and may automatically replace relevant parameter values in C0 by their tuned values in T. Exemplary embodiments can include, function, such as helper functions to facilitate streamlining the tuning of block parameters in a model, such as a Simulink, or Simulink-compatible model. By way of example and referring to a Simulink model, LINLFT can be extended to automatically pick and configure the right tunable block objects (ltiblock.gain, ltiblock.tf, ... ) based on the Simulink blocks selected for tuning A helper function can be provided to push the tuned parameter values computed by hinfstruct back to the Simulink blocks.

Helper functions can include functions, such as undocumented functions, that are used by documented functions when the documented functions operate.

Exemplary Technique for Validating a Result

Exemplary embodiments may treat tunable blocks and LFT models as peers of ordinary LTI models. Doing so may allow exemplary embodiments to directly analyze the tuned control system using standard commands like STEP or BODE. For example, a user may type a command, such as:
>>bode(T) % Plots Bode response of T Modeling environment 220 may process the command and may display one or more Bode plots to the user via a display device.

Exemplary embodiments may further allow users to convert tunable elements to an ordinary LTI model using the standard tf( ), ss( ), zpk( ), frd( ) pid( ) commands. For example, if F is one of the tunable blocks making up T, a user can convert F to a transfer function using a command, such as:
>>Ftuned=tf(T.Blocks.F) % Gets tuned value of F as a transfer function The commands and techniques described above provide users with robust tuning capabilities that are not available when users interact with conventional tools. These techniques/commands further provide robust capabilities without making a textual or graphical modeling environment overly complex or confusing for users.

Exemplary Workflow for Practicing an Embodiment of the Invention

Figure 17:
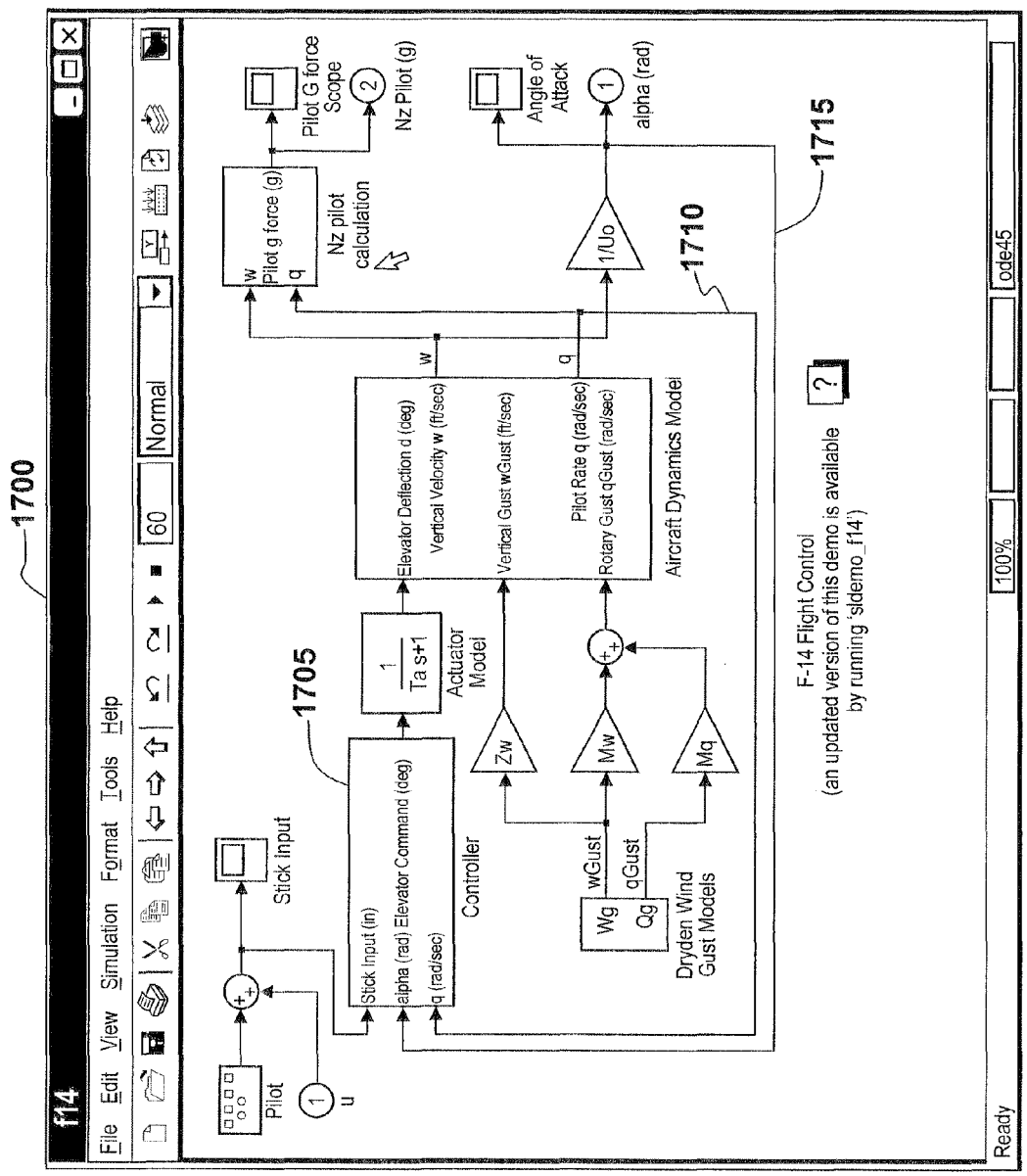
FIGS. 17 and 18 illustrate an exemplary autopilot system that includes tunable components that can be tuned using an embodiment of the invention.

FIG. 17 illustrates an exemplary model 1700 of an analog autopilot used with an F14 jet fighter. Exemplary embodiments and techniques of the invention can be applied to model 1700 to tune the analog autopilot system for the F14. For example, embodiments and techniques may tune the autopilot for a longitudinal axis of the F14 using the Simulink modeling environment. Model 1700 may include controller block 1705 that may implement a standard cascade-loop autopilot.

Referring to FIG. 17, model 1700 may include an inner loop 1710 that commands the pitch rate q, and an outer loop 1715 that commands the angle of attack alpha.

Figure 18:
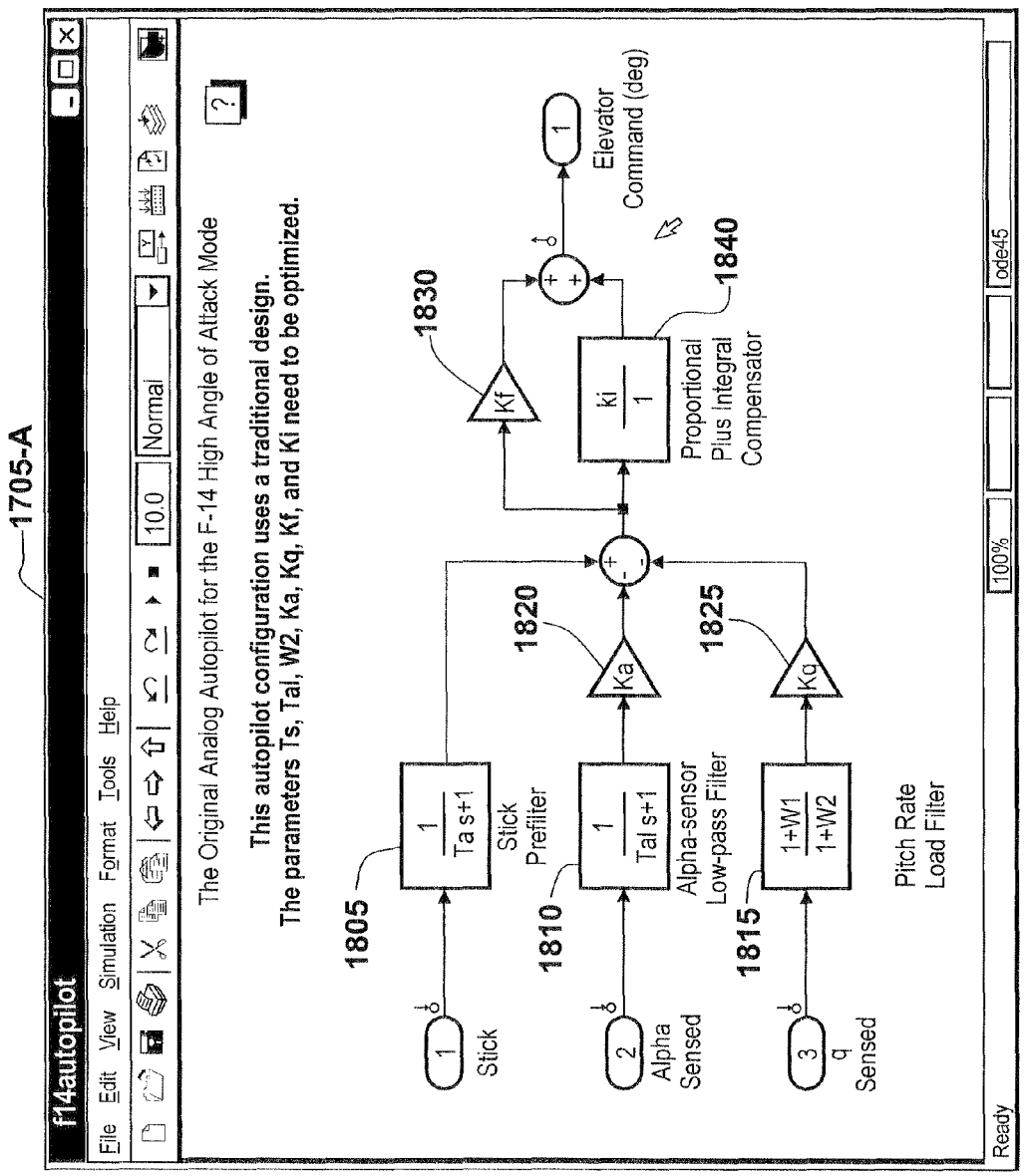

FIG. 18 illustrates controller block 1705 in greater detail. As seen in FIG. 18, window 1705-A includes components and connections included in controller block 1705 in FIG. 17. In FIG. 18, the autopilot has a fixed structure and consists of gain and prefilter blocks that may need to be tuned. For example, tunable gain blocks 1820, 1825 and 1830 are shown with a triangular shape and shading, where the shading may indicate to a user that a gain block is tunable. Prefilter blocks 1805, 1810, and 1815 may be rectangular in shape and may be shaded, where the shading may indicate that a prefilter block is tunable. FIG. 18 may further include a shaded PI compensator 1840 that can be tuned. Embodiments of the invention may use a first color and/or shading density to indicate tunable gain blocks and a second color and/or shading density to indicate tunable prefilter blocks and/or PI compensator blocks.

Exemplary embodiments and techniques allow a user to automatically and jointly tune t selected control elements to achieve a desired level of performance and robustness.

Referring to FIG. 19, a user may enter commands 1905, such as:

```
s = tf('s');
pKa = realp('Ka',0);
pKq = realp('Kq',0);
pKf = realp('Kf',0);
pKi = realp('Ki',1);
pTal = realp('Tal',1);
pW1 = realp('W1',0);
pW2 = realp('W2',0);
``` to define parameters for the autopilot of FIGS. 17 and 18. In FIG. 19, the user may choose to define all parameters as real scalar parameters. In command 1905, the user may decide to initialize most of the parameters to zero.

The user may interact with modeling environment 220 to create the integrator and the alpha and pitch prefilters as expressions involving the parameters of command 1905. For example, the user may enter command 1910 to create the integrator, alpha and pitch prefilters, such as:

```
Integrator = pKi/s;              % Ki/s
AlphaSensor = tf(1,[pTal 1]);    % 1/(Tal*s+1)
PitchFilter = tf([1 pW1],[1 pW2]);  % (s+W1)/(s+W2)
```

Exemplary Technique for Tracking an Objective

The user may wish to formulate a tracking objective as an H∞ constraint when interacting with the autopilot model of FIGS. 17 and 18. A desired bandwidth may be 1 rad/s (radian/second), and the user may desire to have the angle of attack alpha track the stick input (pilot demand) with little overshoot. Exemplary embodiments and techniques can be used to formulate the user's requirements in terms of open-loop shape for the outer loop (alpha) 1715 (FIG. 17).

The user may define what he believes to be a realistic target loop shape by entering commands 1915, such as:

```
wc = 1;   % target crossover
LS = (1+0.01*s/wc)/(0.01+s/wc);
bodemag(LS,{1e-3,1e3}), grid, title('Target loop shape')
```

Figure 20:
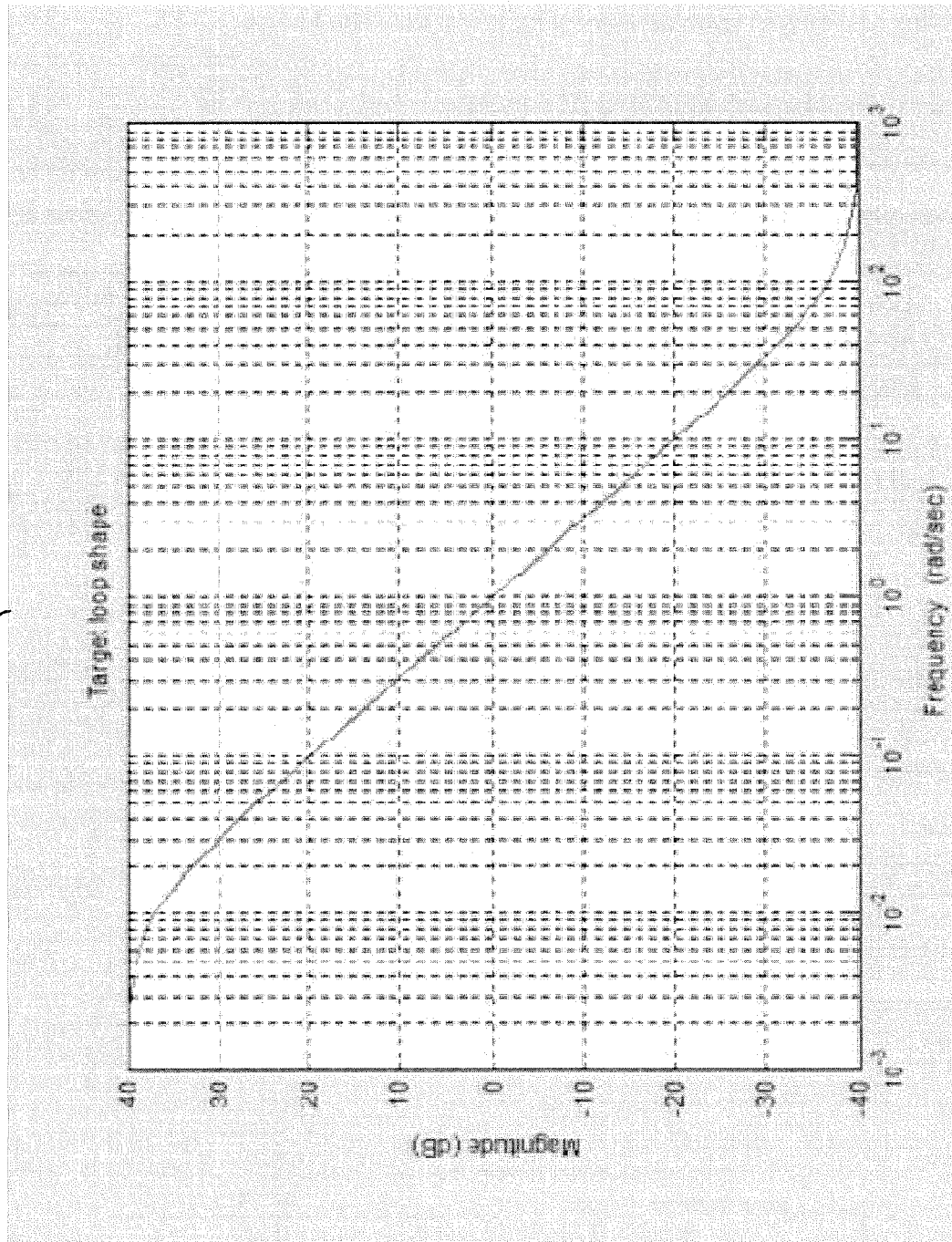
FIG. 20 illustrates an exemplary target loop shape that can be used with an embodiment of the invention that tunes components of the autopilot system of FIGS. 17 and 18.

Modeling environment 220 may process command 1915 and may display a Bode plot as shown in FIG. 20 via GUI 2000. GUI 2000 displays a loop shape that ensures a bandwidth on the order of 1 rad/s (0 dB crossover) and a steady-state error that likely will not exceed 1% (i.e., 40 dB gain at w=0). The user may realize that he cannot realistically expect more gain at w=0 because the outer loop does not include an integrator (i.e., the integrator is in the pitch rate loop of FIG. 17).

A closed-loop model mapping (r, n, d) to alpha, where r is the alpha command, n is the measurement noise on alpha, and d is a disturbance entering at the actuator may need to be derived so that exemplary loop shaping techniques discussed hereinabove can be used. In an exemplary embodiment, a user may derive the closed-loop model by: (1) listing the tuned blocks in the model, (2) marking the signals r, n, d, alpha as linearization inputs/outputs (I/Os), and (3) using the LINLFT command to extract an LFT model of the closed-loop transfer from (r, n, d) to y=alpha. By way of example, the user may create code illustrated in FIG. 21. For example, a user may create code portion 2105 and 2110 by entering text into interface 2100, such as:

```
% Tuned blocks
TunedBlocks = {...
    'f14/Controller/Alpha-sensor Low-pass Filter',...
    'f14/Controller/Pitch Rate Lead Filter',...
    'f14/Controller/Ka',...
    'f14/Controller/Kq',...
    'f14/Controller/Kf',...
    'f14/Controller/Integrator'};
% Structured compensator of Fig. 4
C = blkdiag(AlphaSensor,PitchFilter,pKa,pKq,pKf,Integrator);
linios = [...
    linio('f14/Controller/Stick Prefilter',1,'in') ; ... % r
    linio('f14/Aircraft Dynamics Model',4,'outin') ; ... % alpha,n
    linio('f14/Controller',1,'in') ]; % d
H = linlft('f14',linios,TunedBlocks);
% Closed-loop transfer [r;n;d] -> y=alpha
Ta0 = lft(H,C);
```

Here, the user may require the error signal e=r−y, which can be added as an output of T10 by entering:
T10=[0 0 0;1 0 0]+[1;−1]*Ta0;

The user may complete the formulation as the H∞ constraint by adding the loop shaping weights discussed hereinabove. For example, the user may enter command 2205 into interface 220 (FIG. 22), such as:

```
beta = 3;
Win = blkdiag(1,1/LS,beta);
Wout = blkdiag(1,LS);
T10 = Wout * T10 * Win;
T10.InputName = {'r','n','d'};
T10.OutputName = {'y','e'};
```

In an alternative embodiment, the loop shaping weights may be added programmatically by modeling environment 2200 without requiring user input.

When inputs associated with FIGS. 21 and 22 have been entered into modeling environment 220, a loop shaping goal of FIG. 20 may be captured by the H∞ constraint $$\|T_1(s)\|_\infty < 1.$$

Exemplary Technique for Identifying a Robustness Objective

The cascade loop structure of FIG. 17 is a MIMO control structure with two measurements (alpha and q) and one control (the elevator deflection delta). In some instances, a user may attempt to assess the stability margins of each SISO loop; however, such an approach is not always sufficient to guarantee sufficient MIMO margins. A more reliable and accurate approach that is supported by embodiments of the invention ensures that the peak gain of the sensitivity function $$S=(1+GK)^{-1} \quad \text{(Eq. 16)}$$

remains close to 1. In Eq. 16, G maps delta to (alpha, q) and K is the aggregate controller generating delta from (alpha, q)). In other words, a second requirement is $$\|T_2(s)\|_\infty < 1 \text{ with } T_2 = S \quad \text{(Eq. 18)}$$

A closed-loop model of $T_2$, can be derived by observing that the sensitivity function S is measured at the output (alpha, q) of the plant and use LINLFT as previously discussed. For example, a user may enter command 2210 (FIG. 22), such as:

```
linios = [...
    linio('f14/Aircraft Dynamics Model',4,'inout') ; ... % alpha
    linio('f14/Aircraft Dynamics Model',3,'inout') ]; % q
H = linlft('f14',linios,TunedBlocks);
S0 = lft(H,C);
T20 = S0;
```

Exemplary Tuning Technique

Once the closed-loop model of T2 is derived, the user may wish to tune the controller parameters. Exemplary embodiments facilitate combining the H∞ constraints for tracking and robustness into a single constraint. For example, the single constraint may be represented when the user defines:
    T0=blkdiag(T10,T20);
Modeling environment 220 may instruct the HINFSTRUCT solver to run 5 optimizations using optimizer 360. For example, optimizer 360 may run the five optimizations from five different starting points to mitigate the risk of premature termination at a local minimum. Optimizer 360 may further limit the magnitude of the closed-loop poles to 50 to prevent high gain designs. A user may configure optimizer 360 to perform the above optimization by entering a command such as:
    Options=hinfstructOptions('Display','final','RandomStart',4,'SpecRadius',50);
The user may run the specified optimization by entering a command such as:
    T=hinfstruct(T0,Options);
Modeling environment 220 may return the tuned objective T when the commands are executed.

Exemplary Technique for Validating a Solution

A user may wish to validate a controller design and exemplary embodiments allow the user to interactively perform validations. In an embodiment, the design may be validated by pushing tuned parameter values to the closed-loop transfers Ta0 (for the alpha loop) and S (sensitivity function). The user may enter two commands, such as:

```
Ta = replaceBlock(Ta0,T.Blocks);
S = replaceBlock(S0,T.Blocks);
```

Figure 23:
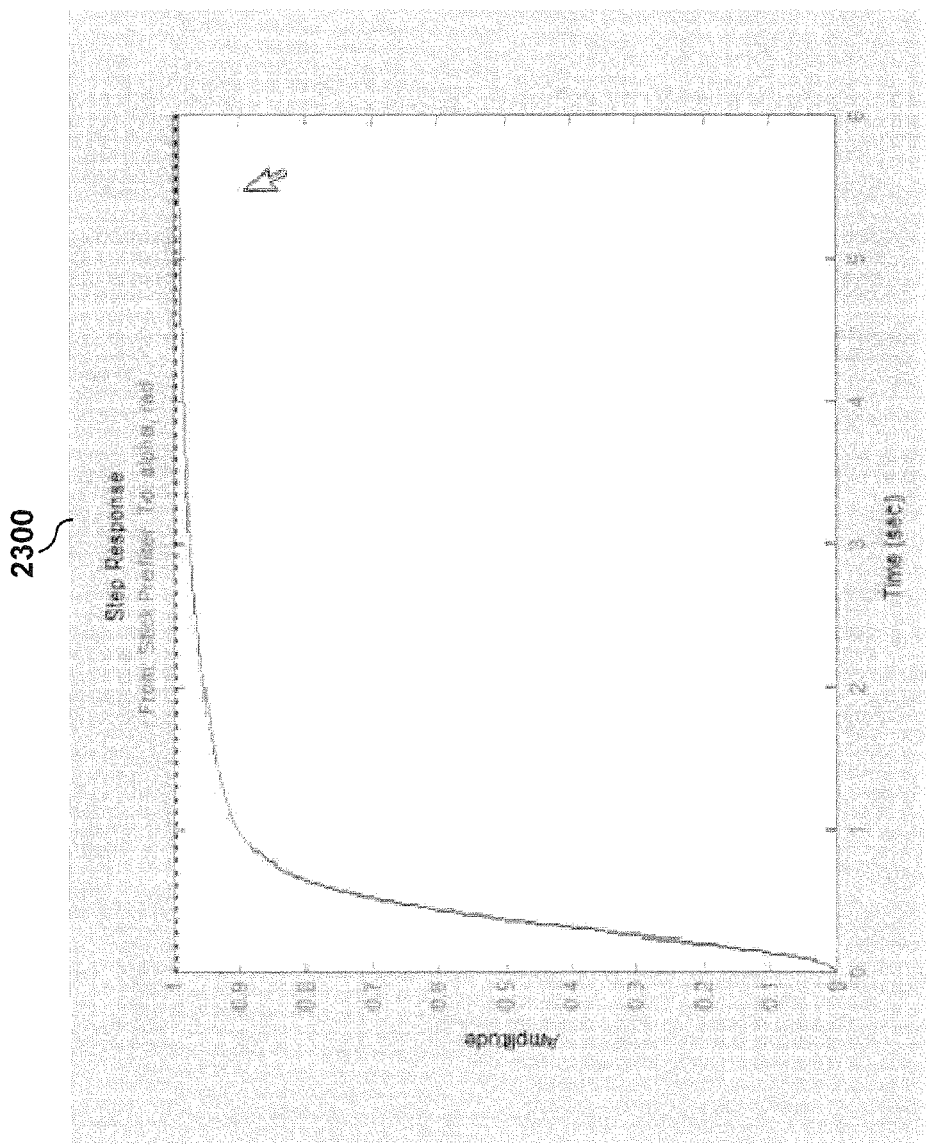
FIG. 23 illustrates an exemplary step response associated with the autopilot system of FIGS. 17 and 18.
Figure 24:
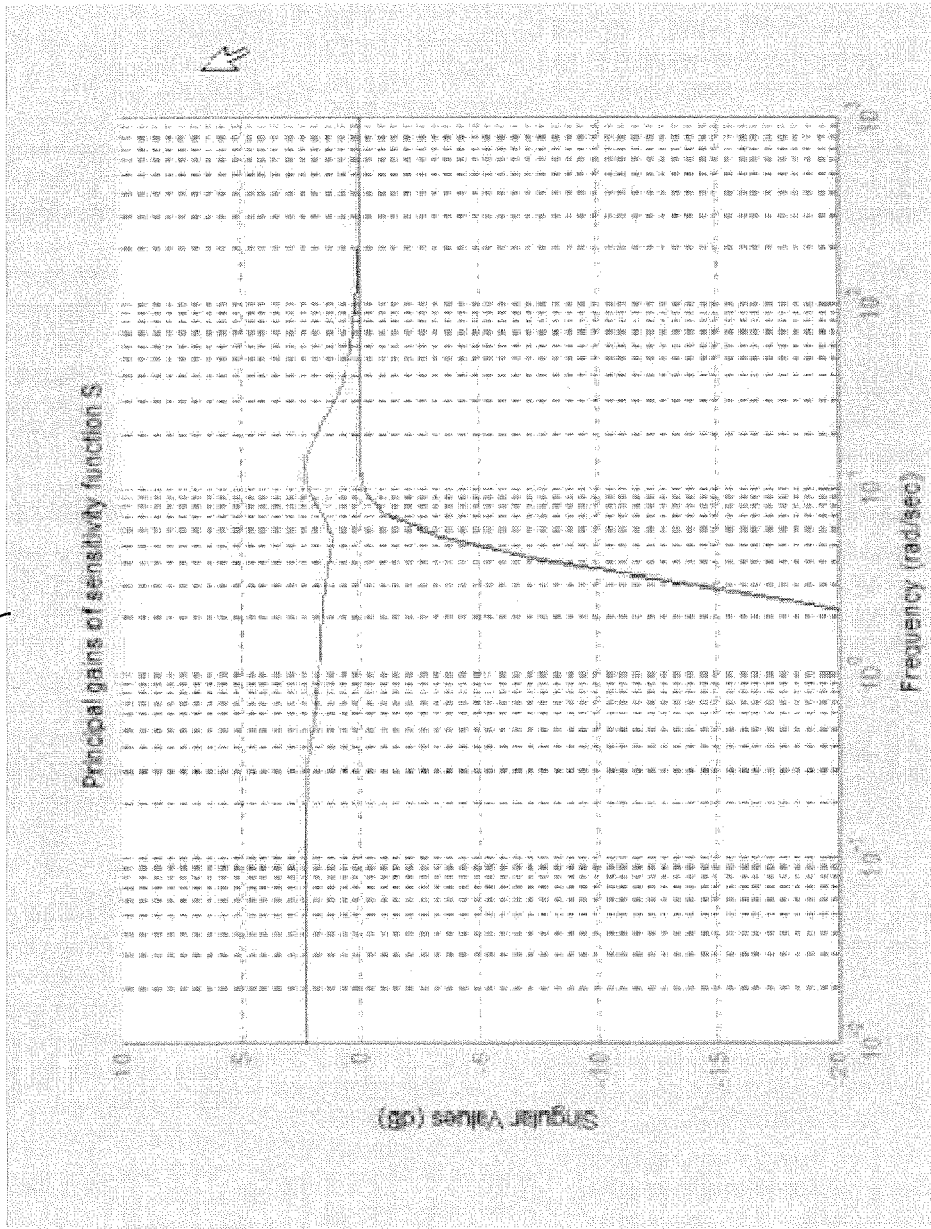
FIG. 24 illustrates a plot that can be used for evaluating the gain of a sensitivity function associated with the autopilot system of FIGS. 17 and 18.

Modeling environment 220 may process the commands and may simulate the closed-loop response of the alpha loop.
FIG. 23 illustrates an exemplary plot 2300 showing the closed-loop response for the alpha loop of model 1700. For example, a user may enter a command, such as:
    step(Ta(1,1)) % alpha command to alpha
for causing plot 2300 to be displayed via display device 250.
Exemplary embodiments may further allow the user to verify that the peak gain of S is close to 0 dB. For example, the user may type:
    sigma(S) % peak gain of sensitivity function
Modeling environment 220 may process the command and may display the plot 2400 of FIG. 24 via display device 250.
Exemplary embodiments further allow a user to access the value of the tuned parameters (e.g., Kq) by interacting with modeling environment 220. For example, a user may type:
    T.Blocks.Kq.Value % tuned value of Kq gain
and modeling environment 220 may produce an answer when the command is processed. For example, the following may be displayed to the user:
    ans=
    4.3486e-001

Exemplary Processing

Figure 25:
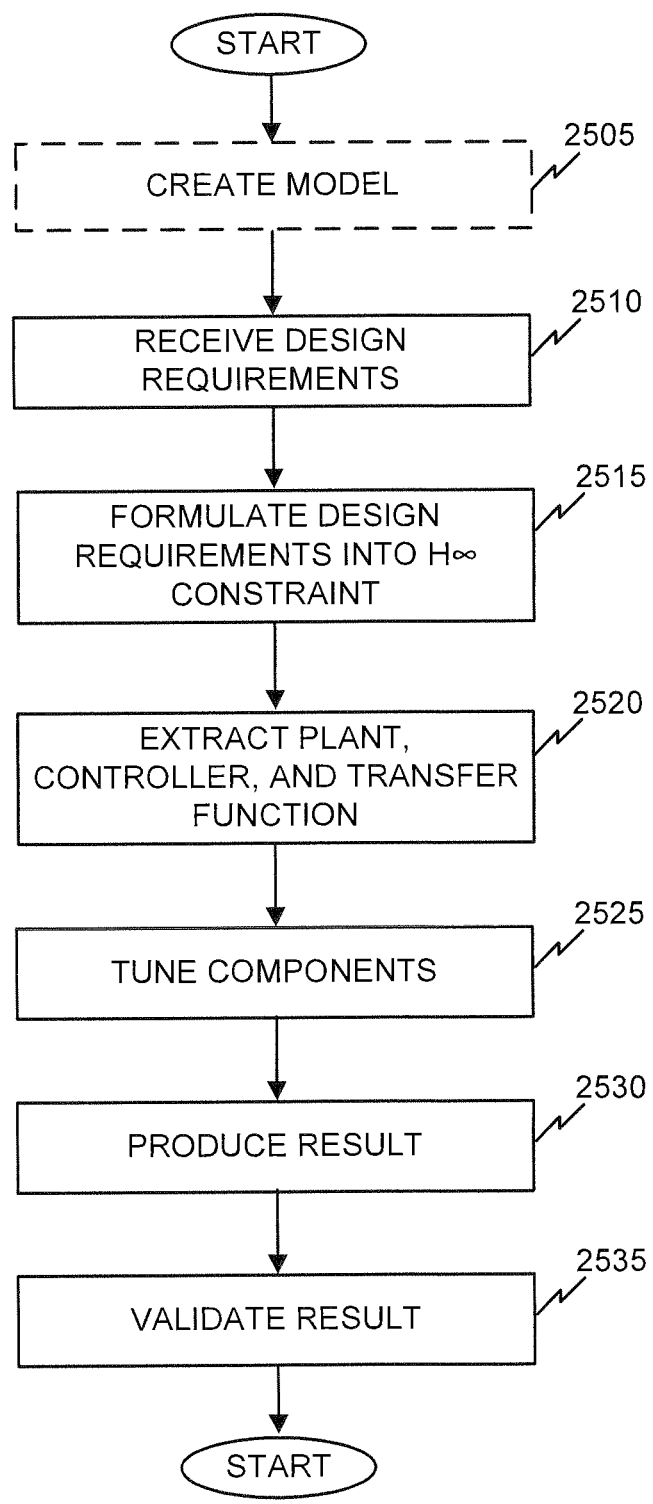
FIG. 25 illustrates exemplary processing that can be used for practicing embodiments of the invention.

FIG. 25 illustrates exemplary processing for practicing one or more embodiments of the invention. A user may create a model that includes one or more tunable components (act 2505). For example, a user may interact with a graphical model and may build a freeform graphical model that includes a number of components connected by lines representing signals. The model may include one or more feedback loops and may include fixed components that can be represented as a plant and one or more tunable components that can be represented via a controller. A user may further create a model using a textual environment in which the user enters commands to create fixed and tunable model components. In an embodiment, act 2505 may be optional, such as when an embodiment of the invention receives an existing model.

When a model is identified, design requirements associated with the model may be received (act 2510). For example, a user may specify a desired gain profile for an open loop response for the model, may specify tunable blocks in the model that can be grouped into a structured controller, and/or may identify locations in a model for an input, output, and disturbance to a closed loop representation of the model. The user may alternatively interact with a command in textual environment that can be used to specify design requirements for the model. In other embodiments, design requirements may be read from a data store, received programmatically via an API, etc.

Design requirements may be formulated into an H∞ constraint using an exemplary embodiment of the invention (act 2515). For example, an embodiment of the invention may automatically transform design requirements (e.g., a loop shape goal) received via a user input device into an H∞ constraint for use in tuning components of the model. Computer 205 may perform processing operations using H∞ synthesis techniques and may extract a plant, controller, and transfer function (act 2520). In an embodiment, the controller may include tunable parameters of the tunable components arranged in a block diagonal structure. For example, transforming the design requirements into H∞ constraint may include mapping a control architecture into a canonical structure as shown in FIG. 7.

After transformation, the plant, controller and transfer function may be in a format compatible with an optimizer that can be used to tune parameters of the model. The compatible format may be input to the optimizer and the optimizer may tune components associated with the structured controller (act 2525). In an embodiment, the optimizer may receive untuned components.

The optimizer may produce a result that includes tuned components (act 2530). For example, tuned components may satisfy design requirements received in act 2510 while satisfying a stability goal for the model.

The result produced by the optimizer may be validated to ensure that the result will allow the model to operate in a desired manner (act 2535). For example, validating a result may ensure that an overshoot margin is not exceeded, that a desired response rate is achieved, that a stability margin is maintained, a desired loop gain is achieved, that a desired disturbance rejection is achieved, etc.

Exemplary Architecture

Figure 26:
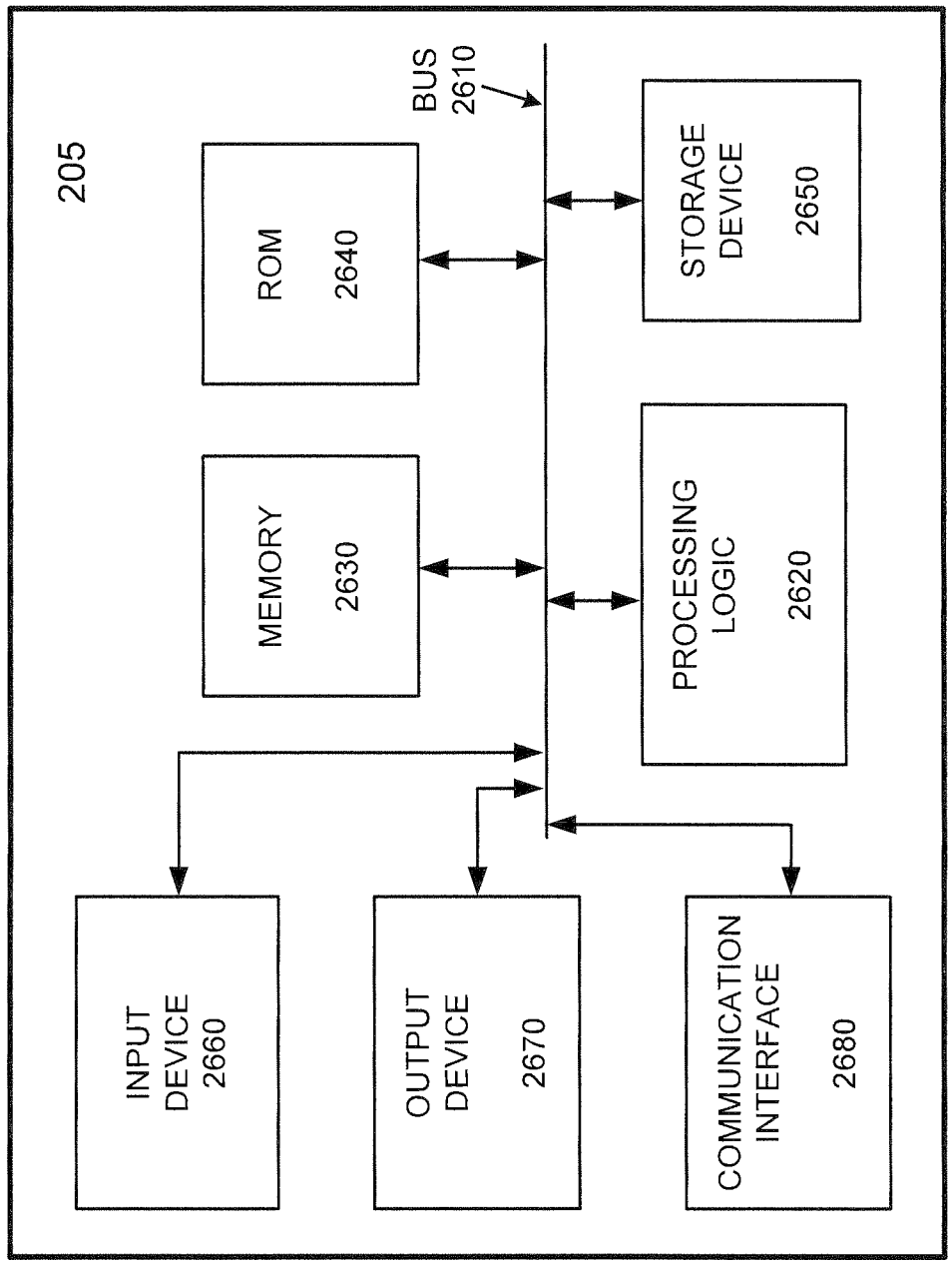
FIG. 26 illustrates an exemplary architecture that can be used for implementing embodiments of the invention.

FIG. 26 illustrates an exemplary computer architecture that can be used to implement computer 205 of FIG. 2. FIG. 26 is an exemplary diagram of an entity corresponding to computer 205. As illustrated, the entity may include a bus 2610, processing logic 2620, a main memory 2630, a read-only memory (ROM) 2640, a storage device 2650, an input device 2660, an output device 2670, and/or a communication interface 2680. Bus 2610 may include a path that permits communication among the components of the entity.

Processing logic 2620 may include a processor, microprocessor, or other types of processing logic (e.g., field programmable gate array (FPGA), graphics processing unit (GPU), digital signal processor (DSP), application specific integrated circuit (ASIC), application specific integrated processor (ASIP), programmable logic device (PLD), etc.) that may interpret and execute instructions. For an implementation, processing logic 2620 may include a single core processor or a multi-core processor. In another implementation, processing logic 2620 may include a single processing device or a group of processing devices, such as a processing cluster or computing grid. In still another implementation, processing logic 2620 may include multiple processors that may be local or remote with respect each other, and may use one or more threads while processing.

Main memory 2630 may include a random access memory (RAM) or another type of dynamic storage device that may store information and instructions for execution by processing logic 2620. ROM 2640 may include a ROM device or another type of static storage device that may store static information and/or instructions for use by processing logic 2620. Storage device 2650 may include a magnetic, solid state and/or optical recording medium and its corresponding drive, or another type of static storage device that may store static information and/or instructions for use by processing logic 2620.

Input device 2660 may include logic that permits an operator to input information to the entity, such as a keyboard, a mouse, a pen, a touchpad, an accelerometer, a microphone, voice recognition, camera, biometric mechanisms, etc. In an embodiment, input device 2660 may correspond to input device 240.

Output device 2670 may include a mechanism that outputs information to the operator, including a display, a printer, a speaker, a haptic interface, etc. Communication interface 2680 may include any transceiver-like logic that enables the entity to communicate with other devices and/or systems. For example, communication interface 2680 may include mechanisms for communicating with another device or system via a network.

The entity depicted in FIG. 26 may perform certain operations in response to processing logic 2620 executing software instructions stored in a computer-readable storage medium, such as main memory 2630. A computer-readable storage medium may be defined as a physical (e.g., tangible) or logical memory device. The software instructions may be read into main memory 2630 from another computer-readable storage medium, such as storage device 2650, or from another device via communication interface 2680. The software instructions contained in main memory 2630 may cause processing logic 2620 to perform techniques described herein when the software instructions are executed on processing logic. Alternatively, hardwired circuitry may be used in place of or in combination with software instructions to implement techniques described herein. Thus, implementations described herein are not limited to any specific combination of hardware circuitry and software.

Although FIG. 26 shows exemplary components of the entity, in other implementations, the entity may contain fewer, different, or additional components than depicted in FIG. 26. In still other implementations, one or more components of the entity may perform one or more tasks described as being performed by one or more other components of the entity.

Exemplary Distributed Embodiment

Distributed embodiments may perform processing using two or more processing resources. For example, embodiments can perform processing using two or more cores in a single processing device, distribute processing across multiple processing devices installed within a single enclosure, and/or distribute processing across multiple types of processing logic connected by a network.

Figure 27:
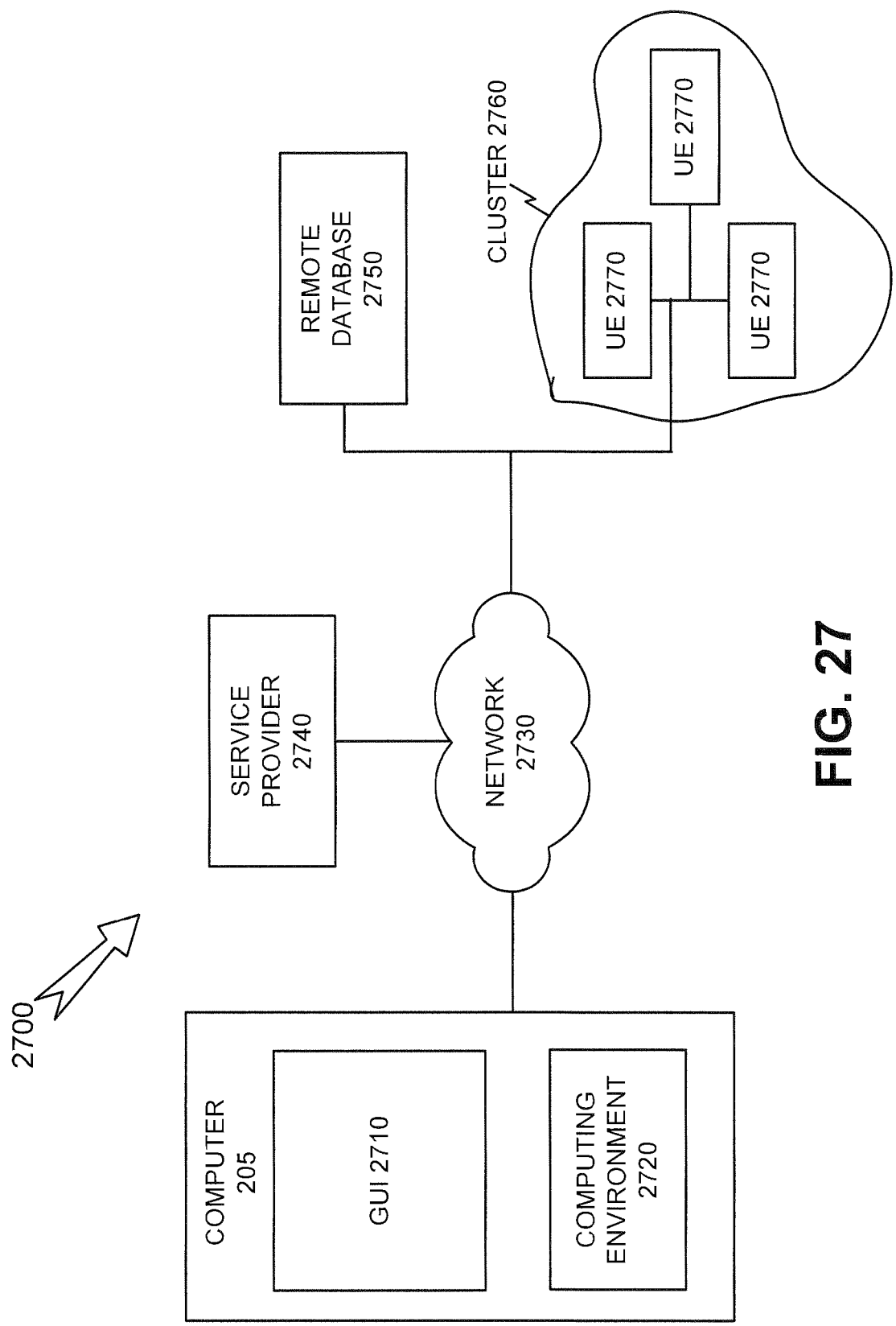
FIG. 27 illustrates an exemplary system for implementing a distributed embodiment of the invention.

FIG. 27 illustrates an exemplary system that can support interactively designing controllers for non-linear models on behalf of a client device (e.g., computer 205) using a distributed computing environment (e.g., computing environment 2720). System 2700 may include computer 205, network 2730, service provider 2740, remote database 2750 and cluster 2760. The implementation of FIG. 27 is exemplary and other distributed implementations of the invention may include more devices and/or entities, fewer devices and/or entities, and/or devices/entities in configurations that differ from the exemplary configuration of FIG. 27.

Computer 205 may include graphical user interface (GUI) 2710 and modeling environment 220. GUI 2710 may include an interface that allows a user to interact with computer 205 and/or remote devices (e.g., service provider 2740). In an exemplary embodiment, GUI 2710 may be similar to the interfaces of FIGS. 4-6 and 15-18.

Network 2730 may include any network capable of transferring data (e.g., packet data or non-packet data). Implementations of network 2730 may include local area networks (LANs), metropolitan area networks (MANs) and/or wide area networks (WANs), such as the Internet, that may operate using substantially any network protocol, such as Internet protocol (IP), asynchronous transfer mode (ATM), synchronous optical network (SONET), user datagram protocol (UDP), IEEE 802.10, etc.

Network 2730 may include network devices, such as routers, switches, firewalls, and/or servers (not shown). Network 2730 may be a hardwired network using wired conductors and/or optical fibers and/or may be a wireless network using free-space optical, radio frequency (RF), and/or acoustic transmission paths. In an implementation, network 2730 may be a substantially open public network, such as the Internet. In another implementation, network 2730 may be a more restricted network, such as a corporate virtual network. Implementations of networks and/or devices operating on networks described herein are not limited to any particular data type, protocol, architecture/configuration, etc. For example, in an embodiment, network 2730 may be a quantum network that uses quantum-compatible networking protocols.

Service provider 2740 may include a device that makes a service available to another device. For example, service provider 2740 may include an entity that provides one or more services to a destination using a server and/or other devices. Services may include instructions that are executed by a destination to perform an operation. Alternatively, a service may include instructions that are executed on behalf of a destination to perform an operation on the destination's behalf.

Assume, for sake of example, that a service provider operates a web server that provides one or more web-based services to a destination, such as computer 205. The web-based services may allow computer 205 to perform distributed simulations of electrical and/or mechanical systems using hardware that is operated by the service provider. For example, a user of computer 205 may be allowed to interactively design PID controllers for system models using the service provider's hardware. In an implementation, a customer (user) may receive services on a subscription basis. A subscription may include an arrangement, such as a monthly subscription, a per-use fee, a fee based on an amount of information exchanged between service provider 2740 and the customer, a fee based on a number of processor cycles used by the customer, a fee based on a number of processors used by the customer, etc.

Remote database 2750 may include a device that stores machine-readable information for use by other devices, such as computer 205. In an embodiment, remote database 2750 may include an array or grid of storage devices (e.g., hard disks, optical disks, solid-state storage devices, etc.) that store data structures containing information about system models, controllers, etc.

Cluster 2760 may include a group of processing devices, such as units of execution 2770 that can be used to perform remote processing (e.g., distributed processing, parallel processing, etc.). Units of execution 2770 may include hardware and/or hardware/software based devices that perform processing operations on behalf of a requesting device, such as computer 205. In an embodiment, units of execution 2770 may each compute a partial result and the partial results can be combined into an overall result for a model.

Exemplary Implementations

An embodiment can include a computer implemented method or machine executable instructions residing on non-transitory computer readable media. The method and/or instructions can be implemented for tuning design parameters in an arbitrary feedback control structure, where the computer implemented method can be practiced using a standalone, e.g., local machine, or in a distributed environment (e.g., using a cluster or grid of computing devices).

For example, when practiced as a computer-implemented method, the method can include identifying one or more tunable components having one or more free parameters that are tuned. The tunable components can be part of a textual or graphical model of the arbitrary feedback control structure. The method can further include identifying one or more feedback loops that include the one or more tunable components.

The method can further include transforming the arbitrary feedback control structure into a standard form that includes a lumped linear model that includes known and fixed components in the arbitrary feedback control structure, and a collection formed using the tunable components. The collection formed from the tunable components can be grouped, or arranged, into a block diagonal fashion. In the method, the components in the block diagonal arrangement may be accessible in that individual components or parameters in the block diagonal arrangement by be visible to a user, available to an algorithm, able to be read from or written to, etc.

The method can use H∞ objectives or constraints for expressing design objectives and/or design requirements. In an implementation of the method, the H∞ objectives or constraints pertain to one or more point-to-point transfer functions in a closed-loop system. The method can further parameterize tunable components. For example, the method can statically parameterize tunable components or dynamically parameterize tunable components. Once tunable components are parameterized, the method may interact with free parameters of the tunable components based on the parameterizing.

The method may tune the feedback control structure using a tuner. For example, in an implementation, the method may tune the feedback control structure using a tuner that is in a class of non-smooth H∞ optimization algorithms. The tuner may operate on the standard form, and may operate on the tunable parameters when the tunable components are in the block diagonal form. The tuner may further tune the parameters to minimize the H∞ objectives and/or to enforce the H∞ constraints.

The computer implemented method can be implemented in a technical computing environment, such as a MATLAB-compatible environment. The method can further be implemented in a textual or graphical environment, such as a Simulink-compatible environment or a Labview-compatible environment. Implementations can further interact with block sets that can include, for example, tunable components, fixed components, connections, algorithms, etc.

The computer implemented method can further be implemented in a manner that supports interactive design and tuning of arbitrary feedback control structures. For example, a method can be implemented that supports real-time interactive design and tuning activities of a user. Implementations of the method can be implemented using FPGAs, ASICs, ASIPs, PLDs, GPUs, DSPs, multi-core devices, distributed computing resources, etc.

Implementations of the method can further allow a user or a device to specify separate objectives or constraints on a plurality of point-to-point closed loop transfer functions in order to simplify multi-objective or multi-requirement design tasks on behalf of a user. Implementations of the method can do this by supporting traditional workflows employed by a user or a group of users. The method can be augmented to include applying the design requirements to the point-to-point transfer functions, where the applying facilitates formulation of multi-objective and multi-requirement design tasks. The method can further be deployed in an object oriented framework when desired.

Embodiments of the invention can further include computer-implemented method acts and/or executable instructions residing on non-transitory computer-readable media. For example, when implemented as a media/executable-instructions, the media can store instructions that when executed practice an embodiment or implementation of the invention. In an implementation, the executed instructions can perform a method or technique of the invention on behalf of a user. In an implementation, the media can hold executable instructions that when executed on a processor implement an API for statically specifying tunable components, dynamically specifying tunable components, and/or for interacting with the parameters of the tunable components. In an implementation, the API can be object-based.

The executable instructions, when executed can identify predefined interfaces that embody parameterizations for a predefined set of components. The instructions can further implement a set of arithmetic operations and/or implement a set of helper functions. The executed instructions can further dynamically create tunable components using the arithmetic operations and the helper functions. In an implementation, dynamically creating can include combining elementary parameter components, and fixed coefficients or fixed components.

Executed instructions can further produce a parametric model of the tunable components. In an implementation, the parametric model can account for tunable parameters of the tunable components, and can allow user inputs to interact with the tunable parameters. For example, user inputs can initialize the tunable parameters, fix the tunable parameters, or freeing selected ones of the tunable parameters.

Another embodiment of the invention can be implemented as a computer-implemented method or via executable instructions residing on one or more non-transitory computer-readable media. The embodiment can implement, deploy, operate, etc., an application program interface (API) for building a standard form of an arbitrary feedback control structure and for specifying point-to-point transfer functions used in an H∞ formulation of design requirements. Embodiments of the API can be object-based when desired.

The embodiment can interact with a user input mechanism that specifies arithmetic operators and/or block diagramming operations using an input syntax. For example, the input syntax can be a syntax familiar to a user in that the user has used the syntax for interacting with other types of control structures, such as PID controllers. The input syntax can allow the user to input a linear time invariant model component, where the linear time invariant model component is used in linear time invariant models and as input software based interfaces, where the software based interfaces describe tunable components having tunable parameters.

The embodiment can combine the linear time invariant model component with the software based interfaces using one or more of arithmetic operators, and block diagramming operations. Examples of block diagramming operations can include, but are not limited to, a series connection, a parallel connection, or a feedback connection. The embodiment can interact with the user input mechanism and the interacting can allow the input syntax to incrementally construct a standard form of an overall control system. The standard form can include the linear time invariant model components and the tunable components. The input syntax can further be used to facilitate generating a parametric model based on the standard form. The parametric model can be in a form compatible with an optimizer, where the compatible form allows the parametric model to be input to the optimizer. The parametric model can be set up in a way that allows it to be tuned in a manner that allows design requirements to be satisfied.

The embodiment can further be configured to support optimizing the parametric model using an optimizer that interacts with the standard form and with the tunable parameters to minimize H∞ objectives, and/or to enforce H∞ constraints. The embodiment can further be configured to provide helper functions to the user input mechanism. The embodiment may allow the helper functions to be accessible to the user via the input mechanism when the user interacts with the API using the input syntax. Still further, the embodiment can be configured to provide functions that are compatible with the input mechanism and that can operate with the input mechanism. The functions can be used to query the control system, and/or to analyze the control system.

An embodiment of the invention can include a computer-implemented method and/or computer-executable instructions that can reside on non-transitory media for programmatically formulating loop shaping requirements into an H∞ formulation. The embodiment, when practiced as a method, can be implemented using standalone or distributed devices and can be configured to support interactive (e.g., real-time) operation on behalf of one or more users. The method can include receiving a target shape for the open-loop gain, or a proxy for the target shape. For example, the target loop shape or proxy can be received from an input mechanism (e.g., keyboard, GUI, etc.) on behalf of a user or may be programmatically retrieved, for example, from a computer-readable storage medium.

The method may include interacting with a software tool that derives a control structure and filters from the target loop shape or the proxy. The software tool may further construct a standard form from the derived control structure and filters, and construct an H∞ constraint from the derived control structure and filters. In the method, the standard form and the H∞ constraint can capture design requirements for a control system.

An additional embodiment can include a computer-implemented method and/or executable instructions residing on a computer readable media for exploiting a structure of a standard form. Exploiting the structure for the standard form can enhance performance of a tuner algorithm that can support interactive workflows on behalf of a user. The embodiment can receive values of tunable parameters supplied by an optimizer during an optimization procedure. Optimization procedures can include machine implemented techniques for performing optimization activities.

The embodiment can further construct, using a construction procedure/technique, a state-space model of the standard form for the tunable parameter values by using software objects to implement tunable components associated with the tunable parameters, making each software object responsible for providing its state-space representation for the received parameter values, aggregating state-space matrices to produce an aggregated state-space matrix for the tunable components, and/or combining the aggregated state-space matrices of the tunable components with the state-space representation of a lumped plant model to obtain a desired closed-loop state-space model of the standard form.

The embodiment can cache intermediate results of the construction procedure to accelerate subsequent gradient computations. Gradient information can be computed by applying a rule, such as a chain rule, to differentiate the objective and constraints, using the same software objects that were used for constructing a state-space model of the standard form, making each software object responsible for providing a gradient of a scalar-valued function with respect to the received parameters, where the scalar-valued function is a by-product of applying the rule, and/or using the cached intermediate results to efficiently aggregate the gradient data supplied by each tunable component into overall gradients of the objective and constraints.

The embodiment can make gradient information available without requiring additional computations on behalf of a processor. For example, gradient information can be made available for no additional computing cost as compared to a computing cost incurred without making gradient information available. The embodiment can further derive a closed loop system for a given value of the tunable parameters at substantially no computational cost, e.g., the cost is negligible in that factoring in the cost does not adversely affect computational budgets associated with system design, modeling times, etc.

CONCLUSION

Implementations may allow users to interactively design controllers for system models using characteristics familiar to the user.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 25, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIG. 2, 3, 26 or 27 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, or a combination of hardware and software. No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

Headings and sub-headings used herein are to aid the reader by dividing the specification into subsections. These headings and sub-headings are not to be construed as limiting the scope of the invention or as defining features of the invention.

What is claimed is:

1. A method comprising:
    identifying one or more tunable components in a model,
        each tunable component including one or more parameters, and
        the identifying being performed by a computing device;
    identifying one or more feedback loops,
        the one or more feedback loops including at least one of the one or more tunable components,
        the one or more feedback loops being identified based on a first command received from a user device, and
        the identifying the one or more feedback loops being performed by the computing device;
    providing, for presentation, a plot based on the first command,
        the providing for presentation being performed by the computing device;
    receiving, based on the provided plot, a second command associated with forming H∞ constraints,
        the second command being received from the user device, and
        the receiving the second command being performed by the computing device;
    formulating, based on receiving the second command and design requirements, one or more H∞ constraints for expressing information associated with the identified one or more feedback loops,
        the H∞ constraints being associated with one or more transfer functions, and
        the formulating being performed by the computing device;
    parameterizing the one or more tunable components,
        the parameterizing being performed by the computing device; and
    interacting, based on the parameterizing the one or more tunable component, with the one or more parameters of the one or more tunable components to tune the identified one or more feedback loops by tuning the one or more parameters to enforce the H∞ constraints, the interacting being performed by the computing device.

2. The method of claim 1, where, when interacting with the one or more parameters of the one or more tunable components to tune the identified one or more feedback loops, the method includes:
    tuning the identified one or more feedback loops using a MATLAB-compatible language.

3. The method of claim 1, further comprising:
    selecting the one or more tunable components from a block set used with a graphical modeling environment.

4. The method of claim 1, where, when interacting with the one or more parameters of the one or more tunable components to tune the identified one or more feedback loops, the method includes:
    determining a speed associated with tuning the identified one or more feedback loops,
        the speed being determined to support an interactive design; and
    using the determined speed to tune the identified one or more feedback loops.

5. The method of claim 1, further comprising:
    receiving a third command received from the user device; and
    representing the H∞ constraints based on the received third command.

6. The method of claim 1, further comprising:
    receiving a result associated with tuning the identified one or more feedback loops; and
    validating the result.

7. The method of claim 6, where, when validating the result, the method includes:
    simulating a closed-loop response associated with the one or more feedback loops.

8. A system comprising:
one or more processors to:
    identify one or more tunable components in a model,
        each tunable component including one or more parameters;
    identify one or more feedback loops,
        the one or more feedback loops including at least one of the one or more tunable components, and
        the one or more feedback loops being identified based on a first command received from a user device;
    provide, for presentation, a plot based on the first command;
    receive, based on the provided plot, a second command associated with forming H∞ constraints,
        the second command being received from the user device;
    formulate, based on receiving the second command and design requirements, one or more H∞ constraints for expressing information associated with the identified one or more feedback loops,
        the H∞ constraints being associated with one or more transfer functions;
    parameterize the one or more tunable components; and
    interact, based on the parameterizing the one or more tunable component, with the one or more parameters of the one or more tunable components to tune the identified one or more feedback loops by tuning the one or more parameters to enforce the H∞ constraints.

9. The system of claim 8, where the one or more processors, when interacting with the one or more parameters of the one or more tunable components to tune the identified one or more feedback loops, are further to:
    tune the identified one or more feedback loops using a MATLAB-compatible language.

10. The system of claim 8, where the one or more processors are further to:
    select the one or more tunable components from a block set used with a graphical modeling environment.

11. The system of claim 8, where the one or more processors, when interacting with the one or more parameters of the one or more tunable components to tune the identified one or more feedback loops, are further to:
    determine a speed associated with tuning the identified one or more feedback loops,
        the speed being determined to support an interactive design; and
    use the determined speed to tune the identified one or more feedback loops.

12. The system of claim 8, where the one or more processors are further to:
    receive a third command received from the user device; and
    represent the H∞ constraints based on the received third command.

13. The system of claim 8, where the one or more processors are further to:
    receive a result associated with tuning the identified one or more feedback loops; and
    validate the result.

14. The system of claim 13, where the one or more processors, when validating the result, are further to:
    simulate a closed-loop response associated with the one or more feedback loops.

15. A non-transitory computer-readable medium that stores computer-executable instructions, the instructions comprising:
    one or more instructions which, when executed by a processor, cause the processor to:
        identify one or more tunable components in a model,
            each tunable component including one or more parameters;
        identify one or more feedback loops,
            the one or more feedback loops including at least one of the one or more tunable components, and
            the one or more feedback loops being identified based on a first command received from a user device;
        provide, for presentation, a plot based on the first command;
        receive, based on the provided plot, a second command associated with forming H∞ constraints,
            the second command being received from the user device;
        formulate, based on receiving the second command and design requirements, one or more H∞ constraints for expressing information associated with the identified one or more feedback loops,
            the H∞ constraints being associated with one or more transfer functions;
        parameterize the one or more tunable components; and
        interact, based on the parameterizing the one or more tunable component, with the one or more parameters of the one or more tunable components to tune the identified one or more feedback loops by tuning the one or more parameters to enforce the H∞ constraints.

16. The medium of claim 15, where one or more instructions to interact with the one or more parameters of the one or more tunable components to tune the identified one or more feedback loops further include:
    one or more instructions to tune the identified one or more feedback loops using a MATLAB-compatible language.

17. The medium of claim 15, where the instructions further include:
    one or more instructions to select the one or more tunable components from a block set used with a graphical modeling environment.

18. The medium of claim 15, where the instructions further include:
    one or more instructions to receive a third command received from the user device; and
    one or more instructions to represent the H∞ constraints based on the received third command.

19. The medium of claim 15, where the instructions further include:
    one or more instructions to receive a result associated with tuning the identified one or more feedback loops; and
    one or more instructions to validate the result.

20. The medium of claim 19, where the one or more instructions to validate the result further include:
    one or more instructions to validate simulate a closed-loop response associated with the one or more feedback loops.

* * * * *

UNITED STATES PATENT AND TRADEMARK OFFICE
CERTIFICATE OF CORRECTION

| | | |
|---|---|---|
| PATENT NO. | : 8,682,453 B2 | Page 1 of 1 |
| APPLICATION NO. | : 12/893670 | |
| DATED | : March 25, 2014 | |
| INVENTOR(S) | : Pascal Gahinet et al. | |

It is certified that error appears in the above-identified patent and that said Letters Patent is hereby corrected as shown below:

In the Claims

Claim 20, column 34, line 57 should correctly read as follows:

"one or more instructions to simulate a closed-loop"

Signed and Sealed this
Eleventh Day of November, 2014

Michelle K. Lee
*Deputy Director of the United States Patent and Trademark Office*